(12) United States Patent
Kayama et al.

(10) Patent No.: US 7,359,349 B2
(45) Date of Patent: Apr. 15, 2008

(54) BASE STATION, RADIO RESOURCE CONTROL EQUIPMENT, MOBILE STATION, COMMUNICATION SYSTEM, AND COMMUNICATION METHOD

(75) Inventors: Hidetoshi Kayama, Yokohama (JP); Lan Chen, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 991 days.

(21) Appl. No.: 10/299,709

(22) Filed: Nov. 20, 2002

(65) Prior Publication Data

US 2003/0095538 A1 May 22, 2003

(30) Foreign Application Priority Data

Nov. 22, 2001 (JP) ............................. 2001-358302

(51) Int. Cl.
*H04Q 7/00* (2006.01)

(52) U.S. Cl. .................... 370/329; 455/452.1; 455/509; 455/512

(58) Field of Classification Search ................ 455/561, 455/452.1, 452.2, 450, 464, 509, 512, 453; 370/322, 329–330, 350, 503
See application file for complete search history.

(56) References Cited

U.S. PATENT DOCUMENTS 5,831,985 A 11/1998 Sandorfi
7,130,636 B2 * 10/2006 Kitazawa et al. ........... 455/450

FOREIGN PATENT DOCUMENTS

| EP | 0923266 A2 * | 6/1999 |
|---|---|---|
| GB | 2 359 700 | 8/2001 |
| JP | 11-178049 | 7/1999 |
| JP | 2000-244523 | 9/2000 |
| JP | 2000-244527 | 9/2000 |
| WO | WO 01/06710 | 1/2001 |
| WO | WO 01/63856 | 8/2001 |

* cited by examiner

*Primary Examiner*—Duc M. Nguyen
*Assistant Examiner*—Anthony S. Addy
(74) *Attorney, Agent, or Firm*—Oblon, Spivak, McClelland, Maier & Neustadt, P.C.

(57) ABSTRACT

A base station includes: an acquisition unit for acquiring a quantity of stored packets from a mobile station, the quantity of stored packets being stored in a buffer for storing the packets transmitted by the mobile station; a radio resource controller for allocating priority radio resources preferentially usable by the mobile station to a radio channel for the mobile station, and for allocating usable radio resources allowed to be used by the mobile station from the priority radio resources to the mobile station by use of the quantity of stored packets acquired by the acquisition unit; and a result notification unit for reporting a result of the allocation by the radio resource controller to the mobile station.

20 Claims, 10 Drawing Sheets

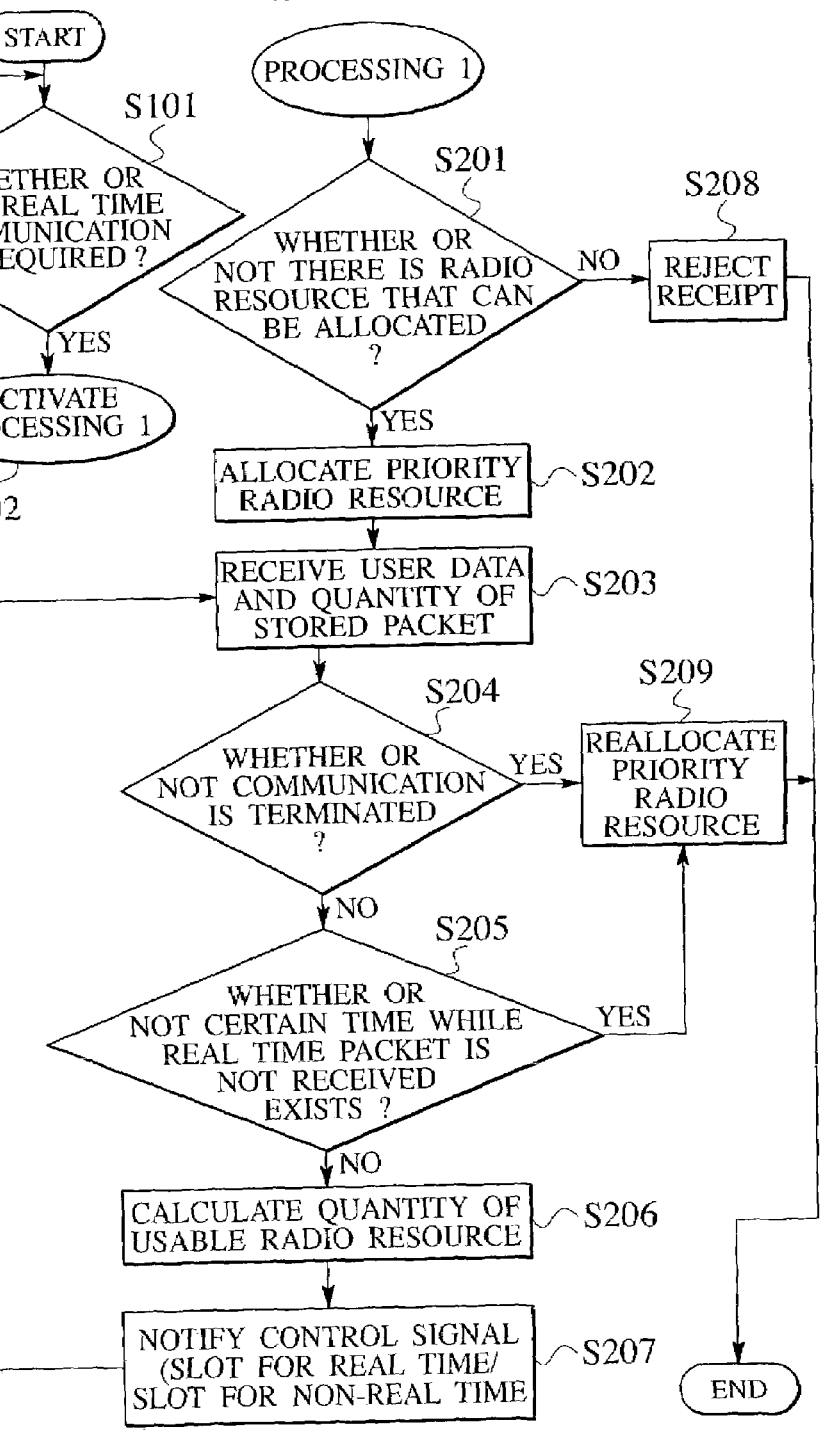

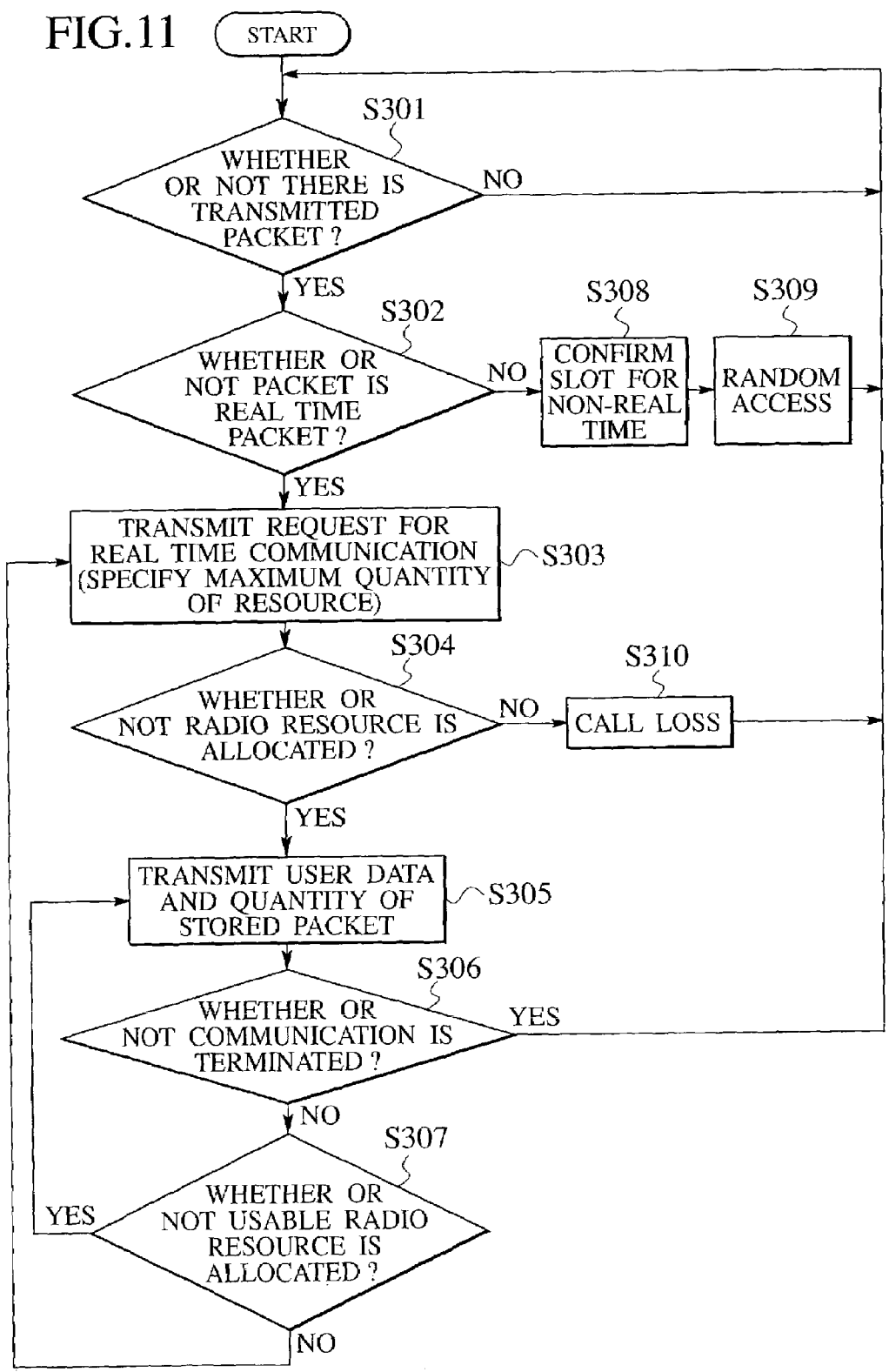

BASE STATION, RADIO RESOURCE CONTROL EQUIPMENT, MOBILE STATION, COMMUNICATION SYSTEM, AND COMMUNICATION METHOD

CROSS REFERENCE TO RELATED APPLICATIONS

This application is based upon and claims the benefit of priority from the prior Japanese Patent Application No. P2001-358302, filed on Nov. 22, 2001; the entire contents of which are incorporated herein by reference.

BACKGROUND OF THE INVENTION

1. Field of the Invention

The present invention relates to a base station, a radio resource control equipment, a mobile station, a communication system, and a communication method.

2. Description of the Related Art

When transmitting packets of information such as a voice and a moving picture, having a short acceptable delay time, it is important to guarantee the acceptable delay time.

For the above purpose, for example, a base station has heretofore given priority to packets transmitted by a mobile station in consideration of the acceptable delay time, and performs scheduling that controls the order of transmitting packets in accordance with priority. To be more concrete, the base station has previously defined the acceptable delay time of packets in accordance with the type of information. Then, the base station has obtained a difference between the defined acceptable delay time and an elapsed time from the generation of packets to the present. The base station has defined a packet having the smallest difference as a packet having the highest priority. In this case, the packets are sequentially transmitted from the one having the smallest difference between the acceptable delay time and the elapsed time. Besides the above, a router has also carried out another type of scheduling that controls to transmit a packet having a higher priority indicated by the DSCP prior to a packet having a lower priority, based on the DSCP (DiffServe Code Point).

Moreover, in order to guarantee the acceptable delay time, the base station has sometimes performed a fixed allocation of radio resources, in which a radio channel is divided into a plurality of time slots, and the time slots are fixedly allocated to mobile stations. In this case, the base station has fixedly allocated time slots necessary to transmit information having short acceptable delay times to mobile stations transmitting the packets of such information. FIG. 1 shows the case where the base station fixedly allocates the uplink packet channel 307 to a mobile station of a user #1 and a mobile station of a user #2.

Each of the frames 309a to 309c is composed of eight time slots. Each time slot 307b composed of two (the fourth and fifth) slots is fixedly allocated to the user #1 in order to transmit any of the real time packets 381b and 383b of the information having a short acceptable delay time. Each time slot 307a composed of three (the first to third) slots is fixedly allocated to the user #2 in order to transmit any of the real time packets 381a, 382a and 383a. Each time slot 307c composed of residual three slots is shared by the user #1 and the user #2 in order to transmit the non-real time packet 308 of information having a long acceptable delay time.

However, in the case of performing the scheduling, the mobile stations and the base station, which transmit and receive the packets always need to be aware of information concerning the priorities of packets stored in the buffers of the mobile stations and the elapsed time necessary to acquire the priorities for the purpose of controlling the transmission sequence of the packets. Therefore, the mobile stations and the base station must always transmit/receive and be aware of information concerning the priorities, the elapsed times and the like for all the packets. Consequently, in the scheduling, there has been a problem that a control time for controlling the sequence is increased with increases a control delay, resulting in an inability to satisfy the acceptable delay time to be required. Moreover, there has been another problem in that overheads are increased.

Moreover, in the case of performing the fixed allocation of radio resources, a certain quantity of radio resources are fixedly allocated irrespective of the quantity of radio resource necessary for each mobile station to actually transmit the packets. Accordingly, there has been a problem in that a situation frequently occurs, in which the actual necessary quantity of radio resources is much smaller than the quantity of radio resource fixedly allocated, leading to a large waste of the radio resources. Specifically, there has been a problem in that each mobile station reserves too much radio resources, thus causing radio resources not to be used efficiently.

For example, in FIG. 1, a certain slot number of time slots 307a and 307b are fixedly allocated regardless of the number of the real time packets 381a to 383a, 381b and 383b transmitted by the mobile stations of the respective users. However, in the second frame 309b, the user #2 uses only one slot in order to transmit the real time packet 382a. Moreover, the user #1 does not use the allocated time slot 307b at all since the user #1 transmits no transmission packet. As a result of this, the slots 2 and 3 allocated to the user #2 and the slots 4 and 5 allocated to the user #1 are wasted, thus deteriorating the utilization efficiency of radio resources.

Furthermore, there has been a case in which the fixed allocation of radio resources cannot cope with a case where a required transmission rate varies in accordance with a change in an image, for example, such as a moving picture, and thus the acceptable delay time cannot be satisfied. Then, the base station has allocated radio resources to the mobile stations in response to the maximum transmission rate in order to solve the problems described above. Consequently, there has occurred a problem that the wasted radio resources increase even further leading to further deterioration of the utilization efficiency of radio resources. Moreover, in order to allocate radio resources in response to the maximum transmission rate, the transmission rate needs to be clear and that the transmission rate needs to be aware by the lower layer. Therefore, the method for allocating radio resources in response to the maximum transmission rate cannot be employed for general-purpose applications, and thus the acceptable delay time cannot be satisfied in some cases.

Accordingly, it is desirable to provide a base station, radio resource control equipment, a mobile station, a communication system and a communication method, which are capable of satisfying the acceptable delay time required for the packets, and enabling the radio resources to be used efficiently.

BRIEF SUMMARY OF THE INVENTION

It is an object of the present invention to enable the acceptable delay time required for the packet to be satisfied and radio resources to be used efficiently.

A base station according to an aspect of the present invention includes an acquisition unit for acquiring a quantity of stored packets from a mobile station, the quantity of stored packets being stored in a buffer storing the packets transmitted by a mobile station, a radio resource controller for allocating radio resources preferentially usable by the mobile station (hereinafter, referred to as "priority radio resources") to a radio channel for the mobile station, and for allocating radio resources allowed to be used by the mobile station (hereinafter, referred to as a "usable radio resource") from the priority radio resources to the mobile station by use of the quantity of stored packets acquired by the acquisition unit, and a result notification unit for reporting a result of the allocation by the radio resource controller to the mobile station.

According to the base station as described above, the radio resource controller allocates the priority radio resources preferentially usable by the mobile station to the radio channel for the mobile station. Therefore, the mobile station can reserve the priority radio resources preferentially usable. Moreover, the acquisition unit acquires the quantity of the stored packets stored in the buffer of the mobile station. Then, the radio resource controller allocates the usable radio resources, which are allowed to be used by the mobile station, among the priority radio resources by use of the quantity of the stored packets acquired by the acquisition unit. The result notification unit reports the result of the allocation to the mobile station. Therefore, the base station can dynamically change the allocation of the usable radio resource in the mobile station by use of the quantity of stored packets stored in the buffer of the mobile station. Furthermore, the base station and the mobile station do not always need to transmit/receive and be aware of information concerning priorities, elapsed times and the like for all packets as in the scheduling.

Accordingly, the base station can satisfy the acceptable delay time required for the packets since a control delay can be prevented and the mobile station can reserve the priority radio resources preferentially usable. Furthermore, the base station dynamically changes the allocation of usable radio resources to prevent the allocation of unnecessary radio resources to the mobile station, thus making it possible to use the radio resources efficiently. Particularly, the base station can satisfy the acceptable delay time by allocating the priority radio resources to some extent to the mobile station and can realize efficient use of radio resources by dynamically changing the allocation of the usable radio resources even if the mobile station transmits a packet in which a transmission rate is not clear, or a packet in which a transmission rate is varied.

BRIEF DESCRIPTION OF THE SEVERAL VIEWS OF THE DRAWINGS

FIGS. 10A and 10B are flowcharts showing an operation of the base station according to the embodiment of the present invention.

FIG. 11 is a flowchart showing an operation of the mobile station according to the embodiment of the present invention.

DETAILED DESCRIPTION OF THE INVENTION

An embodiment of the present invention will be described with reference to the drawings.

Figure 1:
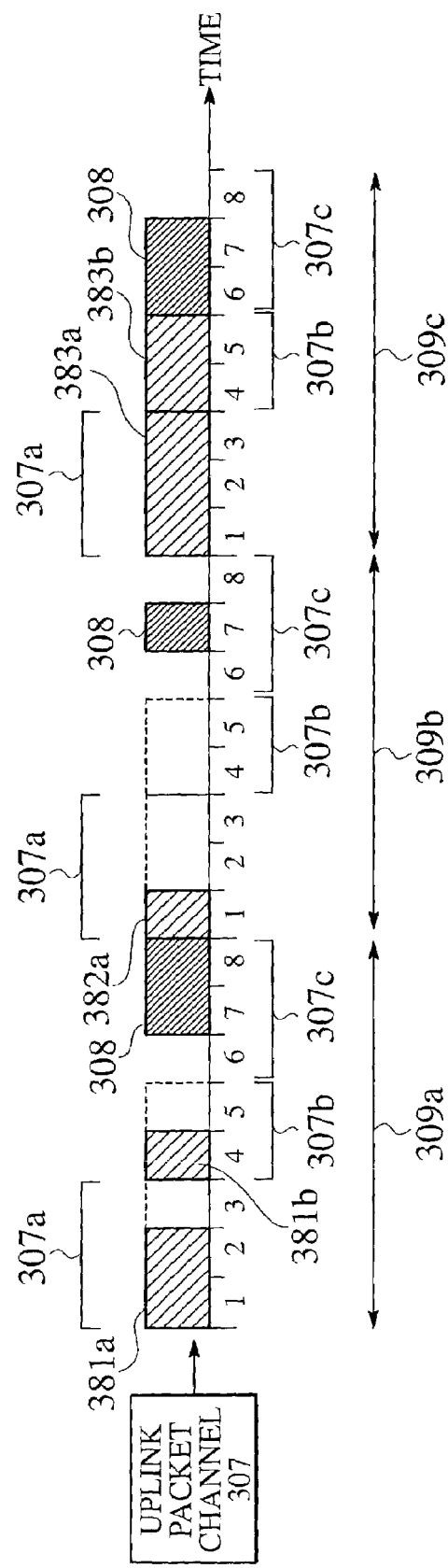
FIG. 1 is a view explaining a conventional fixed allocation of radio resources.
Figure 2:
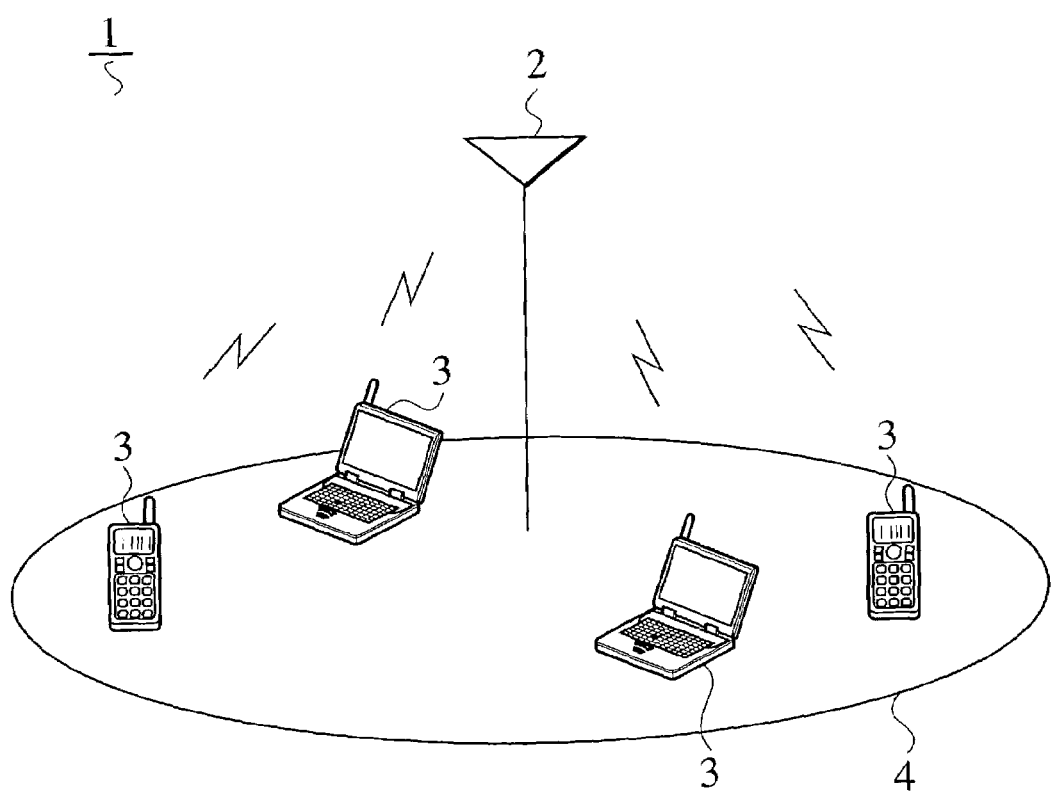
FIG. 2 is a view showing a constitution of a communication system according to an embodiment of the present invention.

As shown in FIG. 2, the communication system 1 includes the base station 2 and the plurality of mobile stations 3.

The base station 2 forms the wireless zone 4, and transmits/receives packets to/from the plurality of mobile stations 3 present in the wireless zone 4. The base station 4 allocates radio resources to radio channels for mobile station 3, and reallocates the radio resources. Radio resources imply physical resources necessary to transmit the packets. The radio resources differ depending on the wireless access system. For example, in TDMA (Time Division Multiple Access), time slots obtained by dividing radio channels by time become radio resources. In CDMA (Code Division Multiple Access), electric power becomes radio resources.

Figure 3:
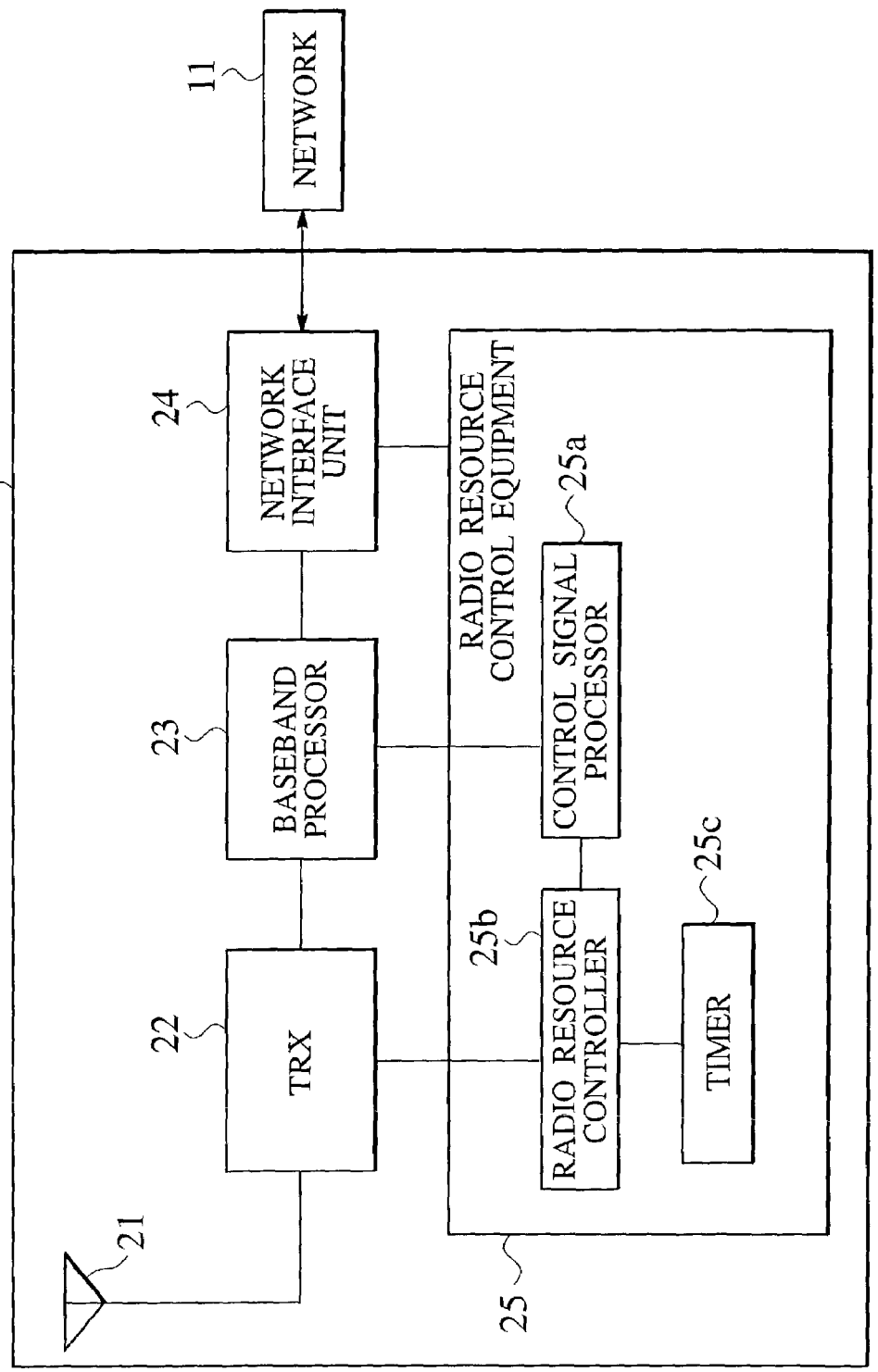
FIG. 3 is a block diagram illustrating a configuration of a base station according to the embodiment of the present invention.

As shown in FIG. 3, the base station 2 includes the antenna 21, the TRX 22, the baseband processor 23, the network interface unit 24, and the radio resource control equipment 25. The radio resource control equipment 25 includes the control signal processor 25a, the radio resource controller 25b, and the timer 25c.

The antenna 21 transmits/receives signals from/to the mobile stations 3. The antenna 21 inputs received signals to the TRX 22. Moreover, the antenna 21 transmits signals inputted from the TRX 22. The TRX 22 is a wireless unit. The TRX 22 performs an A/D conversion for the signals received by the antenna 21 and inputs the converted signals to the baseband processor 23. Moreover, the TRX 22 receives spread transmission signals from the baseband processor 23, performs a D/A conversion, and inputs the transmission signals to the antenna 21. Moreover, the TRX 22 inputs the use condition of the radio resources to the radio resource controller 25b.

The baseband processor 23 carries out signal processing such as despreading of the signals inputted from the TRX 22. The base band processor 23 inputs control signals to the control signal processor 25a in the case of receiving the control signals from the TRX 22. Moreover, the baseband processor 23 carries out signal processing such as spreading of signals inputted from the control signal processor 25a and the network interface unit 24. The baseband processor 23 inputs the processed signals to the TRX 22. The network interface unit 24 is connected to the network 11.

The control signal processor 25a takes out information included in the control signals that were inputted from the baseband processor 23. The control signal processor 25a inputs the information to the radio resource controller 25b in accordance with the contents of the information that is taken out. To be more concrete, the control signal processor 25a inputs information to the radio resource controller 25b, the information being used for the allocation of radio resources by the radio resource controller 25b. The information used for the allocation of radio resources by the radio resource controller 25b includes, for example, requests for real time communications from the-mobile station 3, the quantity of stored packets stored in the buffers of the mobile station 3 without being transmitted, acknowledgements of the packets and the like.

Moreover, the control signal processor 25a generates control signals including radio resource information concerning the radio resources. The control signal processor 25a receives the radio resource information from the radio resource controller 25b. The radio resource information includes, for example, a result of the allocation of the radio resources to the user of each mobile station 3 by the radio resource controller 25b (hereinafter, referred to as an "allocation result"), transmission information concerning a usable radio resource in the transmission of a low-priority transmission (hereinafter, referred to as an "open radio resource"), and the like. The control signal processor 25a inputs the generated control signals to the baseband processor 23.

In such a manner, the antenna 21 receives the signals transmitted from the mobile station 3, the TRX 22 converts the signals, the baseband processor 23 processes the signals, and the control signal processor 25a takes out the information included in the control signals respectively. Thus, the antenna 21, the TRX 22, the baseband processor 23 and the control signal processor 25a function as an acquisition unit for acquiring the information necessary to control the allocation of radio resources from the mobile stations, the information including the request for the real time communications, the quantity of the stored packets, the acknowledgements of the packets and the like.

Moreover, the control signal processor 25a generates signals, which include radio resource information, the baseband processor 23 processes the signals, the TRX 22 converts the signals, and the antenna 21 transmits the signals to the mobile station 3 respectively. Thus, the control signal processor 25a, the baseband processor 23, the TRX 22 and the antenna 21 function as a result notification unit for reporting to the mobile station 3 the result of the allocation by the radio resource controller 25b and the radio resource information including the information of the open radio resource.

Figure 4:
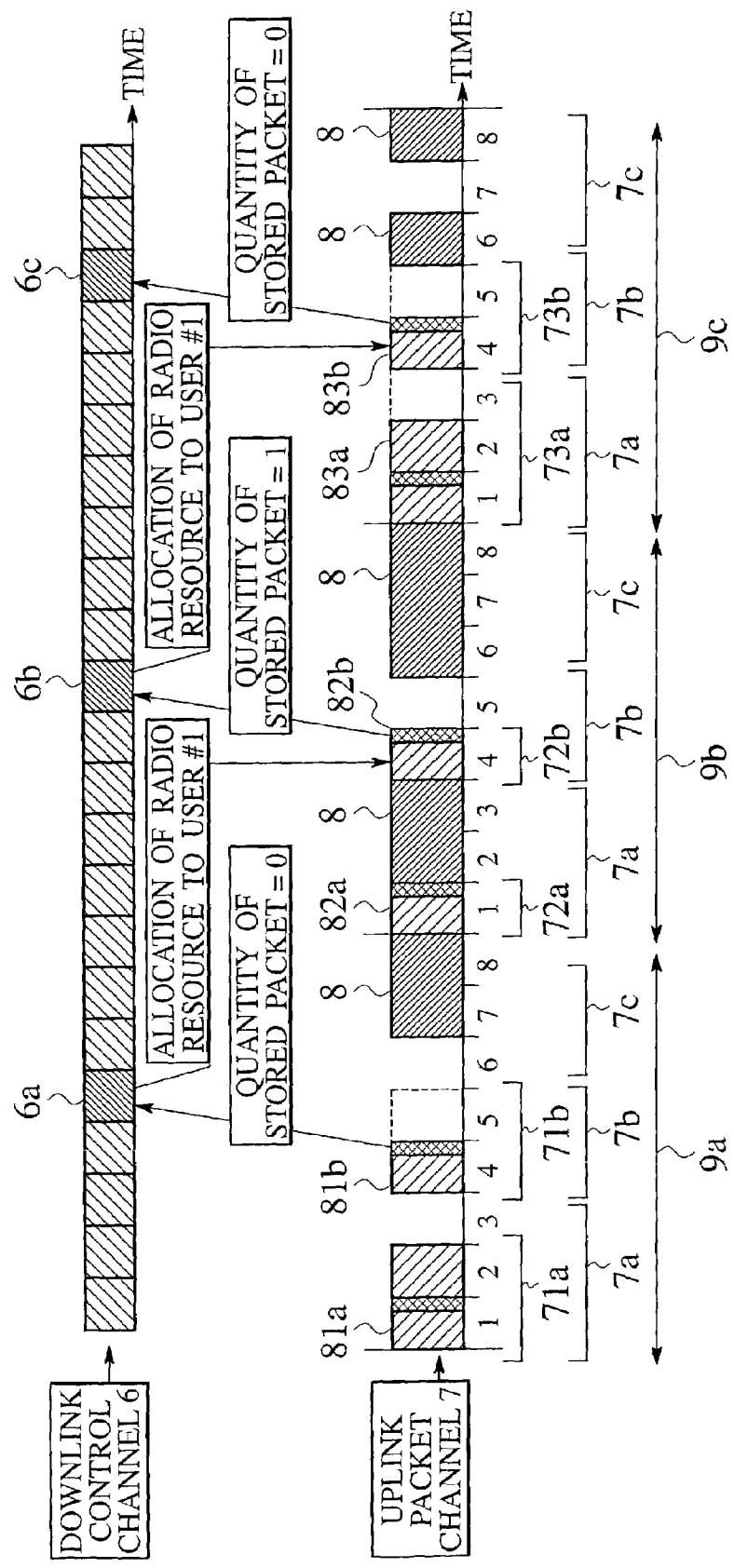
FIG. 4 is a view explaining an allocation of radio resources in TDMA according to the embodiment of the present invention.

The radio resource controller 25b allocates the radio resources to the mobile station 3. FIG. 4 is a view explaining the allocation of the radio resources by the radio resource controller 25b when the wireless access system is TDMA.

The uplink packet channel 7 is shared by the plurality of mobile stations 3. In FIG. 4, two users of the mobile stations 3, who are the user #1 and the user #2, share the uplink packet channel 7. Signals from the users #1 and #2 undergo packet multiplexing on the uplink packet channel 7 and are transmitted.

The radio resource controller 25b first allocates the priority radio resources to the uplink packet channel 7 for the users #1 and #2 performing real time communications.

Here, real time communications imply transmission/receipt of information for which real time characteristics are required. The information for which real time characteristics are required implies information having a short acceptable delay time. The packet of the information for which the real time characteristics are required is referred to as a real time packet. The real time packet becomes a packet having a high priority in transmission since its acceptable delay time is short. The real time packet includes, for example, packets transmitting information such as a voice, a moving picture, and a streaming image. In the real time communications, transmission rates necessary to transmit the information vary depending on QoS (Quality of Service) required for the transmission of information. Moreover, in the case of transmitting moving picture, necessary transmission rates vary in response to the movement of the image.

Meanwhile, non-real time communications imply the transmission/receipt of information for which real time characteristics are not required. Information for which real time characteristics are not required implies information having a long acceptable delay time. The transmission packet of information for which real time characteristics are not required is referred to as a non-real time packet. A non-real time packet becomes a packet having a low priority in transmission, since its acceptable delay time is long. Therefore, the packet having a low priority denotes a non-real time packet having a long acceptable delay time. The non-real time packet includes, for example, a packet of transmitted data.

The radio resource controller 25b receives a notice of the generation of real time packets when these packets are generated in the mobile stations 3 of the users #1 and #2. Upon receiving the notice of the generation of real time packets from the mobile stations 3 of the users #1 and #2, the radio resource controller 25b allocates the priority radio resources to the mobile stations 3 of the users #1 and #2. More concretely, the mobile stations 3 of the users #1 and #2 make requests to the base station 2 for real time communications, and thus report the generation of the real time packets thereto. Therefore, upon receiving the requests for real time communications from the mobile stations 3 of the users #1 and #2, the radio resource controller 25b allocates the priority radio resources to the mobile stations 3 of the users #1 and #2. From the control signal processor 25a, the radio resource controller 25b receives the requests for real time communications from the mobile stations 3. Note that the requests for the real time communications are included in control signals transmitted by an uplink control channel. Therefore, the control signal processor 25a verifies the existence of the request of the real time communications.

In the case of receiving a request for real time communications, the radio resource controller 25b receives from the mobile stations 3 of the users #1 and #2, a specification of the maximum quantity of radio resources necessary for the real time communication. The maximum quantity of the radio resources necessary for real time communication is the maximum quantity of radio resources necessary to transmit the real time packet. The maximum quantity of radio resources is the numbers of time slots in the case of the TDMA, and the amount of electric power in the case of the CDMA. Note, when the maximum quantity of radio resources necessary for real time communications is not understood by the users #1 and #2 the maximum quantity for the radio resource controllers 25b is set to predetermined default values.

Then, to the mobile stations 3 of the users #1 and #2, the radio resource controller 25b allocates priority radio resources sufficient to reserve the maximum quantity of radio resources specified by the users #1 and #2. In such a manner, the quantity of the priority radio resources is determined by the radio resource controller 25b and the mobile stations 3. Note that the default values of the maximum quantity of the radio resources is preferably set large. In accordance with the above, the base station 2 can satisfy the acceptable delay time even if the maximum quantity of radio resources that are actually necessary are large.

Note that the radio resource controller 25b receives the input of the use condition of the radio resources from the TRX 22 and always monitors the use condition of the radio resources. The use condition of the radio resources is the use condition of the time slots in the TDMA, and is the received electric power of the base station 2, in the CDMA. Then, the radio resource controller 25b allocates the priority radio resources to the mobile stations 3 of the respective users in consideration of the use condition of the radio resources and the allocation of radio resources of the uplink packet channel 7 to the plurality of mobile stations 3. For example, the radio resource controller 25b determines that it is incapable of allocating the priority radio resources to the mobile station 3 of the user #1 when the maximum quantity of radio resources which is specified by the user #1, is more than the quantity of radio resources in the entire uplink packet channel 7 (the maximum quantity of radio resources of the uplink packet channel 7). Moreover, the radio resource controller 25b also determines that it is incapable of allocating the priority radio resources to the mobile station 3 of the user #1 when the sum of the maximum quantity of the radio resources, which is specified by the user #1, and the quantity of the priority radio resources already allocated to other users is more than the maximum quantity of radio resources of the uplink packet channel 7. In such cases, the radio resource controller 25b rejects the receipt of the request for real time communication from the mobile station 3, and does not allocate priority radio resources thereto.

In the case of FIG. 4, the maximum number of the time slots for the radio resource controller 25b is set as the maximum quantity of radio resources by the users #1 and #2. The radio resource controller 25b allocates a quantity of priority radio resources sufficient to reserve the specified maximum number of the time slots to the mobile stations 3 of the users #1 and #2. In this case, the radio resource controller 25b also allocates time slot numbers allowed to be used by the mobile stations 3 of the users #1 and #2. As shown in FIG. 4, the uplink packet channel 7 is composed of time slots, every eight slots constituting one frame. The radio resource controller 25b allocates the time slot 7b composed of two (fourth and fifth) slots to be used as the priority radio resource to the mobile station 3 of the user #1. To the user #2, the radio resource controller 25b allocates the time slot 7a composed of three (first to third) slots to be used as the priority radio resource. Note that the radio resource controller 25b does not allocate the time slot 7c composed of three (sixth to eighth) slots to neither the user #1 nor #2.

As described above, it is preferable that the radio resource controller 25b allocates the priority radio resource to the mobile station 3 when a real time packet transmitted by the mobile station 3 is generated. In accordance with the above, the base station 2 can allocate the priority radio resource in response to the generation of the real time packet. Therefore, the radio resources can be used more efficiently in connectionless-type communications.

After allocating the priority radio resources to the mobile stations 3 of the respective users #1 and #2, the radio resource controller 25b allocates the usable radio resources. The radio resource controller 25b allocates the radio resources actually allowed to be used by the mobile stations 3 from the priority radio resources. The radio resource controller 25b allocates by using quantity of stored packets in the buffers of the mobile stations 3 without being transmitted, being acquired from the mobile stations 3 through the antenna 21, the TRX 22, the baseband processor 23 and the control signal processor 25a. In such a manner, the radio resource controller 25b allocates the priority radio resources preferentially usable by the respective users, and dynamically changes the allocation of the radio resources allowed to actually be used by the respective users among the concerned priority radio resources.

When allocating priority radio resources, the radio resource controller 25b first allocates the entire priority radio resources as the first usable radio resources.

Next, the radio resource controller 25b determines the quantity of usable radio resources, which are to be allocated to the mobile stations 3 of the respective users #1 and #2 by the quantity of the stored packets. It is satisfactory if the radio resource controller 25b determines the quantity of the usable radio resources by the quantity of the stored packets. No limitations are imposed on a method for using the quantity of the stored packets to determine the quantity of usable radio resources.

For example, the radio resource controller 25b can allocate the quantity of the usable radio resources directly in response to the quantity of stored packets. To be more concrete, the radio resource controller 25b allocates packets equal to the quantity of stored packets acquired from the mobile stations 3 as only the usable radio resources which are immediately able to be transmitted. For example, when each quantity of stored packets is three, the radio resource controller 25b allocates a time slot composed of three slots as the usable radio resource in the TDMA, and allocates electric power sufficient to transmit three packets in a short time as the usable radio resource in the CDMA. In accordance with the above, the radio resource controller 25b can allocate radio resources directly in response to the quantity of the acquired stored packets, and can eliminate the necessity of the operation and time for obtaining the variations of the quantity of the stored packets. Therefore, the radio resource controller 25b can carry out the allocation easily and instantaneously.

Moreover, the radio resource controller 25b may obtain the variations of the quantity of stored packets by use thereof, and may allocate the quantity of the usable radio resources in accordance with the variations. For example, the radio resource controller 25b obtains a variation between a quantity of a stored packet acquired from the mobile station 3 this time and a quantity of a stored packet acquired last time therefrom. Then, in the case where the quantity of the stored packet increases, the radio resource controller 25b allocates a quantity, which is obtained by adding a quantity of radio resources sufficient to immediately transmit packets equivalent to an increment thereof to the quantity of radio resources allocated last time, as the usable radio resources. Moreover, in the case where the quantity of the stored packet decreases, the radio resource controller 25b allocates a quantity which is obtained by subtracting a quantity of radio resources sufficient to immediately transmit packets equivalent to a decrement thereof from the quantity of radio resources allocated last time, as the usable radio resources.

Concretely, when the quantity of the stored packet decreased by one and the radio resource controller 25b allocated a time slot composed of two slots last time, the radio resource controller 25b allocates one slot obtained by subtracting one slot transmitting a decreased one packet from the previous two slots as the usable radio resource. Moreover, when the quantity of the stored packet increases by one and the radio resource controller 25*b* allocated electric power of 16 (dBm) last time, the radio resource controller 25*b* can allocate electric power of 24 (dBm) obtained by adding electric power of 8 (dBm) sufficient to transmit an additional one transmission packet in a short time to the previous electric power of 16 (dBm) as the usable radio resources.

In the case of performing the allocation in accordance with the variations as described above, the radio resource controller 25*b* can perform gradual control corresponding to the variations of the quantity of the stored packets. For example, the radio resource controller 25*b* can perform a gradual control such as increasing or decreasing the quantity of the radio resources to be allocated if the variations of the quantity of the stored packets increase.

Figure 5:
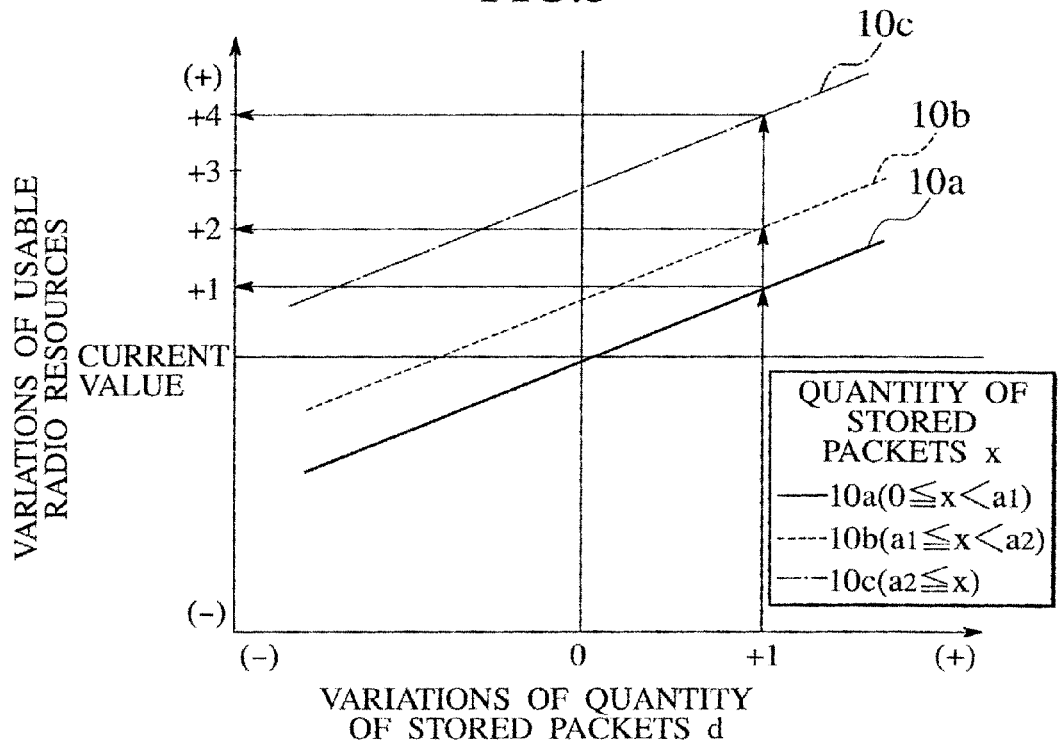
FIG. 5 is a graph calculating variations of a usable radio resource according to the embodiment of the present invention.

Moreover, the radio resource controller 25*b* may allocate the quantity of the usable radio resources in response to both of the variations and the quantity of the stored packets. For example, the radio resource controller 25*b* can allocate the usable radio resources by means of a graph shown in FIG. 5. FIG. 5 is a graph for calculating the variations of the quantity of the usable radio resources to be allocated by the radio resource controller 25*b*. The axis of ordinates in FIG. 5 represents the variations of the quantity of usable radio resources to be allocated by the radio resource controller 25*b*, and the axis of abscissas therein represents the variations d of the quantity of stored packets. In FIG. 5, the variations of the quantity of the radio resources become variations of the number of slots in the time slots.

The radio resource controller 25*b* selects a line to be used for obtaining the variations of the quantity of the usable radio resources among the lines 10*a* to 10*c* shown in the graph in accordance with a quantity of stored packets X. The radio resource controller 25*b* uses the line 10*a* when the quantity of the stored packets X is 0 or more to less than $a_1$, it uses the line 10*b* when the quantity of stored packets X is $a_1$ or more to less than $a_2$, and it uses the line 10*c* when the quantity of stored packets X is $a_2$ or more.

Values of $a_1$ and $a_2$ are appropriately set such that the radio resource controller 25*b* can use a line in which the variations of the quantity of the usable radio resources to be allocated are larger in the positive direction as the quantity of the stored packets X is larger. In accordance with the above, the radio resource controller 25*b* can allocate more usable radio resources to a mobile station 3 storing a larger quantity of stored packets. Therefore, the mobile station 3 can transmit many packets stored in the buffer without transmission using so many usable radio resources, and can prevent the delay of the packet transmission. Note that $a_1$ is set equal to 10 and $a_2$ is set equal to 20 in this embodiment.

Moreover, in the lines 10*a* to 10*c*, as the variations of the quantity of stored packets d increase in the positive direction, the variations of the quantity of the usable radio resources to be allocated are also increased in the positive direction in proportion to the variations d. In accordance with the above, the radio resource controller 25*b* can allocate more usable radio resources to the mobile station 3 storing an increased quantity of stored packets. Therefore, the mobile station 3 can transmit the increased packets by using many usable radio resources, and can prevent the delay of the packet transmission.

As described above, when the radio resource controller 25*b* carries out the allocation in accordance with both of the variations and the quantity of stored packets, the radio resource controller 25*b* can perform the gradual control corresponding to the variations, and can allocate the usable radio resources directly in consideration of the quantity of stored packets. For example, the radio resource controller 25*b* will be able to cope with a case where the packets must be transmitted quickly such as in the case when the quantity of stored packets is enormous.

Note that radio resources become time slots when the wireless access system is TDMA. Therefore, it is preferable that the radio resource controller 25*b* use the lines 10*a* to 10*c* in which the variations of the quantity of usable radio resources, are determined by the variations d of the quantity of the stored packets, become integers as shown in FIG. 5. Thus, the radio resource controller 25*b* can directly obtain the variations of the quantity of the usable radio resources to be allocated by use of the lines 10*a* to 10*c* without performing operations such as rounding up and down. Meanwhile, the radio resources become the electric power when the wireless access system is CDMA. Therefore, the radio resource controller 25*b* does not need to use the graph in which the variations of the quantity of usable radio resources, which are determined by variations of the quantity of stored packets, are integers.

The radio resource controller 25*b* allocates the usable radio resources in accordance with both of the variations and the quantity of stored packets by use of the graph shown in FIG. 5. The allocation of the usable radio resources by the radio resource controller 25*b* will be described by exemplifying the allocation of the usable radio resources to the mobile station 3 of the user #1 in the third frame 9*c*, shown in FIG. 4.

The quantity of stored packets X acquired from the user #1 in the first frame 9*a* is zero. The quantity of the stored packets X acquired from the user #1 in the second frame 9*b* is one. Therefore, the radio resource controller 25*b* determines the variation of the quantity of stored packets as "+1". Moreover, the quantity of the stored packets in the second frame 9*b* is one. Therefore, the radio resource controller 25*b* determines the variation "+1" of the quantity of the usable radio resources by the variations of the quantity of stored packets d=+1 by use of the line 10*a*. The radio resources to be used by the user #1 in the second frame 9*b* is the time slot 72*b* composed of one slot to be used, which is the fourth slot. Therefore, the radio resource controller 25*b* allocates the time slot 73*b* composed of two slots which are obtained by adding "1" to the time slot 72*b* composed of one slot as the radio resource to be used by the user #1 in the third frame 9*c*.

In such a manner, the radio resource controller 25*b* allocates the radio resources allowed to actually be used by the mobile stations 3 of the respective users by use of the quantity of stored packets. Therefore, the radio resource controller 25*b* can dynamically change the allocation of the usable radio resources among the priority radio resources allocated to the mobile stations 3 of the respective users.

For example, the time slot 7*b* composed of two (the fourth and fifth) slots to be used is allocated as a priority radio resource to the mobile station of the user #1. In the first frame 9*a*, the radio resource controller 25*b* allocates the time slot 71*b* composed of two (the fourth and fifth) slots to be used as the usable radio resource to the user #1. Next, the radio resource controller 25*b* calculates the variations of the quantity of usable radio resources based on the quantity of stored packets: X=0 acquired from the user #1 in the first frame 9*a* by use of the graph of FIG. 5. Then, in the second frame 9*b*, the radio resource controller 25*b* allocates the time slot 72*b* composed of only one (the fourth) slot to be used as the usable radio resource to the user #1.

Next, the radio resource controller 25b calculates the variations of the quantity of the usable radio resources based on the quantity of the stored packets: X=1 acquired from the user #1 in the second frame 9b by use of the graph of FIG. 5. Then, in the third frame 9c, the radio resource controller 25b allocates the time slot 73b composed of two (the fourth and fifth) slots to be used as the usable radio resource to the user #1 again.

Moreover, the time slot 7a composed of three (the first to third) slots to be used is allocated as a priority radio resource to the mobile station of the user #2. In the first frame 9a, the radio resource controller 25b allocates the time slot 71a composed of two (the first and second) slots to be used as the usable radio resource to the user #2. In the subsequent second frame 9b, the radio resource controller 25b allocates the time slot 72a composed of only one (the first) slot to be used by the user #2. In the subsequent third frame 9c, the radio resource controller 25b allocates the time slot 73a composed of three (the first to third) slots to be used by the user #2.

Note that the radio resource controller 25b sequentially allocates usable radio resources to the time slots for use in the priority radio resources of the respective users from a time slot having a small number, that is, a time slot early in order. For example, in the second frame 9b, the radio resource controller 25b allocates the time slot 72b composed of the fourth time slot to be used in the fourth and fifth time slots, to be used as the priority radio resource allocated to the user #1. Moreover, in the second frame 9b, the radio resource controller 25b allocates the time slot 72a composed of the first time slot to be used among the first to third time slots to be used as the priority radio resource allocated to the user #2.

The time slots 71a to 73a of the usable radio resources allocated to the user #2 as described above are used for transmitting the real time packets 81a to 83a of the user #2. The time slots 71b to 73b of the usable radio resources allocated to the user #1 are used for transmitting the real time packets 81b to 83b of the user #1.

Note that the radio resource controller 25b may allocate the usable radio resources by use not only of the quantity of stored packets but also other elements including the use condition of the usable radio resources. For example, when the base station 2 does not receive a real time packet from the usable radio resource, the radio resource controller 25b may decrease the allocation of the usable radio resources step by step at a certain interval.

Next, the radio resource controller 25b allocates the time slot 7c composed of three (the sixth to eighth) slots that are not allocated to either of the users #1 and #2 for the transmission of the non-real time packet 8 of either of the users #1 and #2. Specifically, the radio resource controller 25b sets the radio resources that are not allocated to the users as open radio resources, which are allowed to be used for the transmission of the non-real time packets 8 having low priority in transmission.

Furthermore, in the time slot 7b of the priority radio resource allocated to the user #1, the radio resource controller 25b also sets the fifth time slot of the second frame 9b, which is not allocated as a usable radio resource, as a open radio resource. Similarly, in the time slots 7a of the priority radio resource allocated to the user #2, the radio resource controller 25b also sets the third time slot of the first frame 9a and the second and third time slots of the second frame 9b, which are not allocated as the usable radio resources, as the open radio resources.

Note that, while the users #1 and #2 can share the open radio resources, the radio resource controller 25b allows the open radio resources of the priority radio resources of the user #1 to be preferentially used for the transmission of non-real time packets 8 of the user #1. Then, the radio resource controller 25b allow the user #2 to use the open radio resources of the priority radio resources of the user #1 when the user #1 is not using them. Similarly, the radio resource controller 25b allows the open radio resources of the priority radio resources of the user #2 to be preferentially used for the transmission of the non-real time packets 8 of the user #2.

As described above, the radio resource controller 25b sequentially allocates the usable radio resources to the time slots for use of the priority radio resources of the respective users from the time slot early in order. In accordance with this, the radio resource controller 25b vacates a time slot late in the order, that is, a time slot late in time without allocating the slot as the usable radio resource, and can set the slot as the open radio resource. Therefore, leeway is given to a time for the mobile station 3 to access the base station 2 since the mobile station 3 uses the open radio resources, and the mobile station 3 can catch the use of the time slots that have become the open radio resources because these time slots have not been allocated as the usable radio resources. Accordingly, the base station 2 can improve the utilization efficiency of the open radio resources, and can achieve the effective utilization of the radio resources.

As described above, it is preferable that the radio resource controller 25b set the radio resources on the radio channel, which have not been allocated as the usable radio resources, as the open radio resources allowed to be used by the mobile stations for transmitting the packets having low priority in transmission. In accordance with this, the radio resources that have not been allocated as the usable radio resources are used for transmitting the non-real time packets having low priority in transmission, and are not wasted. Therefore, the base station 2 achieves the effective utilization of the radio resources, and can use the radio resources more efficiently.

Moreover, the radio resource controller 25b allocates the usable radio resources by means of the quantity of stored packets of the mobile station 3 upon receiving this quantity of stored packets from the control signal processor 25a. The control signal processor 25a takes out the quantity of stored packets included in control signals from the control signals received by the antenna 21, inputted through the TRX 22 to the baseband processor 23, and inputted thereto by the baseband processor 23. Then, the control signal processor 25a inputs the quantity of the stored packets to the radio resource controller 25b. Therefore, the radio resource controller 25b will allocate the usable radio resources when the mobile station 3 transmits the packets thereto. Accordingly, the base station 2 can acquire the quantity of stored packets in combination with the receipt of the packets from the mobile station 3. Therefore, the base station 2 can allocate the usable radio resources as a part of the processing in receiving the packets.

Figure 6:
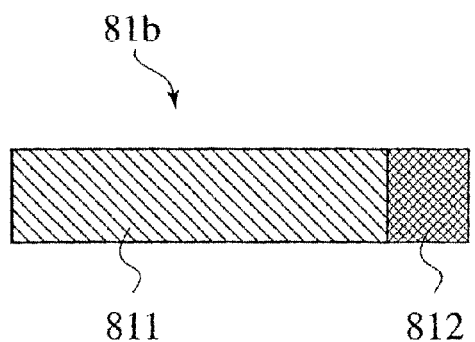
FIG. 6 is an illustration showing a real time packet according to the embodiment of the present invention.

Note that the real time and non-real time packets transmitted from the mobile station 3 include user data and the control signals. As an example thereof, FIG. 6 shows the real time packet 81b shown in FIG. 4. The user data 811 included in the real time packet 81b is information itself including a voice, a moving picture, a streaming image and the like. The control signal 812 is a signal controlling the transmission of the packet. The quantity of the stored packet is included in the control signal 812. Information with the quantity of stored packets of zero is included in the control signal 812.

Similarly, information with a quantity of stored packets of one of zero is included in the control signals of the real time packets 82*b* and 83*b*, respectively.

Moreover, the radio resource controller 25*b* may allocate periodic timings for allowing the mobile stations 3 of the respective users to report the quantity of stored packets to the uplink control channel. Then, the radio resource controller 25*b* may allow the mobile stations 3 to transmit the control signals including the quantity of the stored packets at these timings. Thus, the base station 2 can acquire the quantity of stored packets periodically from the mobile stations 3. Then, the radio resource controller 25*b* can allocate periodically the usable radio resources. Therefore, the radio resource controller 25*b* can review the allocation of the usable radio resources periodically to prevent the allocation of unnecessary radio resources.

After allocating the radio resources, the radio resource controller 25*b* inputs radio resource information such as allocation results of the usable radio resources and information about open radio resources to the control signal processor 25*a*. The control signal processor 25*a* generates the control signals 6*a* to 6*c* including the radio resource information. The control signal processor 25*a* inputs the generated control signals 6*a* to 6*c* to the baseband processor 23. Then, as shown in FIG. 4, the TRX 22 reports the control signals 6*a* to 6*c* by the downlink control channel 6 to the mobile station 3 through the antenna 21. As described above, the radio resource controller 25*b* controls the mobile station 3 through the control signal processor 25*a* and the like.

The control signal 6*a* includes the number of slots "one slot" and time slot number for use "No. 4" of the usable radio resource in the second frame 9*b*, which has been allocated to the user #1 by use of the quantity of stored packets: X=1 acquired from the user #1 in the first frame 9*a*, and includes the number of slots "six slots" and time slot numbers "No. 2, No. 3 and Nos. 5 to 8" of the open radio resources. Moreover, the control signal 6*b* includes the number of slots "two slots" and time slot numbers for use "Nos. 4 and 5" of the usable radio resources in the third frame 9*c*, which has been allocated to the user #1 by use of the quantity of stored packets: X=1 acquired from the user #1 in the second frame 9*b*, and includes the number of slots "three slots" and time slot numbers "Nos. 5 to 8" of the open radio resources. Note that the radio resource information includes that the usable radio resources are radio resources for transmitting real time packets and that the open radio resources are radio resources for transmitting non-real time packets.

Furthermore, the radio resource controller 25*b* reallocates the priority radio resources when the usable radio resources allocated to the mobile station 3 are unused for a certain period. For example, the base station 2 determines that the usable radio resources allocated to the mobile station 3 are not used for a certain period in the case of not receiving the real time packets using the usable radio resources from the mobile station 3 for the certain period.

To be concrete, the radio resource controller 25*b* is linked with the timer 25*c*. The radio resource controller 25*b* receives an acknowledgement of packets to the effect that a user's real time packets have been received from the control signal processor 25*a*. In this case, the radio resource controller 25*b* acquires the time of the packet receipt. Thus, the time each user uses the usable radio resources is known by the radio resource controller 25*b*. Then, based on the time when each user uses the usable radio resources, the radio resource controller 25*b* determines that the usable radio resources have been unused for a certain period in the case of not receiving the acknowledgement that the real time packets of the user concerned have not been received for the certain period from the control signal processor 25*a*. Then, the radio resource controller 25*b* reallocates the priority radio resources of the user.

Figure 7:
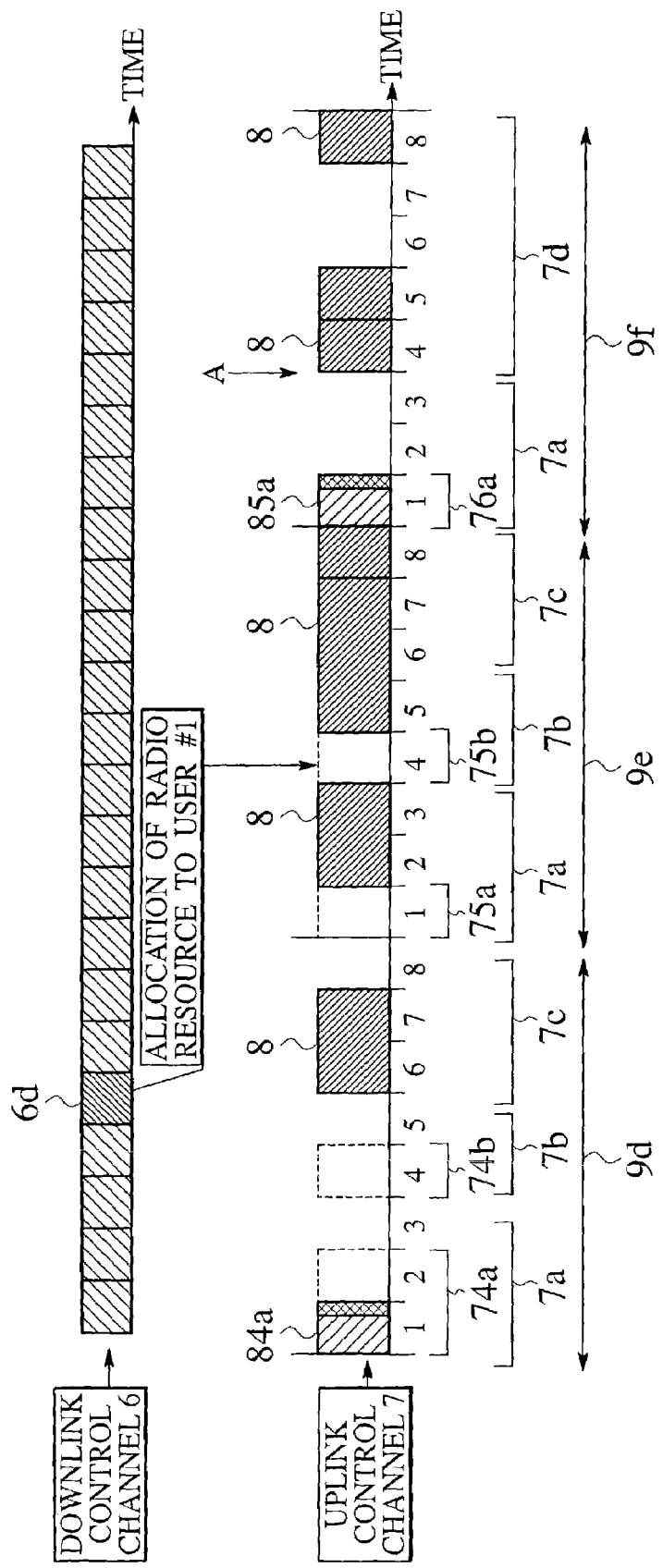
FIG. 7 is a view explaining a reallocation of priority radio resources according to the embodiment of the present invention.

The reallocation of the priority radio resources will be described with reference to FIG. 7. In FIG. 7, the time slots 7*a*, each being composed of three (the first to third) slots to be used, are allocated as the priority radio resources to the user #2 of the mobile station 3 in the first to third frames 9*d* to 9*f* similarly to the first to third frames 9*a* to 9*c* shown in FIG. 4. Moreover, the time slots 74*a* to 76*a* are allocated as the usable radio resources to the user #2 and used for transmitting the real time packets 84*a* and 85*a*.

Meanwhile, the time slots 7*b*, each being composed of two (the fourth and fifth) slots to be used, are allocated as priority radio resources to the user #1 in the first and second frames 9*d* and 9*e* similarly to the first and second frames 9*a* and 9*b* shown in FIG. 4. Moreover, the time slots 74*b* and 75*b* are allocated as the usable radio resources to the user #1.

The mobile station 3 of the user #1 does not transmit the real time packets by use of the time slots 74*b* and 75*b* allocated as the usable radio resources in the first and second frames 9*d* and 9*e*. Therefore, the base station 2 does not receive the real time packets of the user #1, which are to be transmitted by use of the time slots 74*b* and 75*b* as the usable radio resources, for a certain period. Consequently, the radio resource controller 25*b* determines that the usable radio resources allocated to the user #1 have not been used for a certain period.

Then, in the subsequent third frame 9*f*, the radio resource controller 25*b* reallocates the time slot 7*b* composed of two (the fourth and fifth) slots that have already been allocated as the priority radio resources to the user #1. Consequently, the time slots 7*b* to the mobile station 3 of the user #1 are reallocated while the allocation of the usable radio resources by the control signal 6*d* of the downlink control channel 6 is taken as the last allocation. In the third frame 9*f*, the radio resource controller 25*b* does not allocate the time slot 7*d* composed of five (the fourth to eighth) slots to either of the users #1 and #2. Specifically, the radio resource controller 25*b* sets the five slots of the time slot 7*d* as the open radio resources and uses the same slots for transmitting the non-real time packets 8.

As described above, it is preferable that the radio resource controller 25*b* reallocate the priority radio resources when the usable radio resources are unused for a certain period. Accordingly, the base station 2 can release the priority radio resources that are not used by the mobile station 3 allocated with the radio resources to other mobile stations 3, and can use the radio resources more efficiently. Moreover, even if there exists the frame 9*e* where the time slot 75*a* as the usable radio resource is not used, the radio resource controller 25*b* does not reallocate the priority radio resources immediately, but allocates the time slot 76*a* as the usable radio resource. Therefore, the mobile station 3 can transmit a packet immediately when a real time packet 85*a* is generated, and can prevent delay.

Note it is preferable that the certain period that is a reference for reallocating the priority radio resources is short from a viewpoint of effective utilization of radio resources. If the certain period is short, the allocated priority radio resources is reallocated quickly if there are radio resources for use that are not being used, and therefore, the radio resources can be utilized efficiently. On the other hand, the certain period should be long from a viewpoint of shortening a time taken for allocation control. In the case where the certain period is too short, the allocation and reallocation of the priority radio resources will be repeated, leading to possible elongation of the time taken for the allocation control. Accordingly, the certain period is appropriately set in consideration of the effective utilization of radio resources and the shortening of the time taken for the allocation control.

Next, the case of using the CDMA as the wireless access system will be described with reference to FIG. 8. The uplink packet channel 207 is shared by the users #1 and #2. Since the same frequency is multiplexed by different spreading codes in the case of the CDMA, it is necessary that the total received power of the signals from the respective mobile stations 3 in the base station 2 be of a certain value or less in the uplink packet channel 207. This certain value is referred to as an uplink channel capacity. In the CDMA, the electric power in the base station 2 becomes radio resources, and therefore, the radio resource controller 25b allocates the received electric power and controls the total received power in the base station 2 so as to be equal to/less than the uplink channel capacity. Note that the received power of the base station 2 and the transmission power of the mobile stations 3 are equal to each other.

Figure 8:
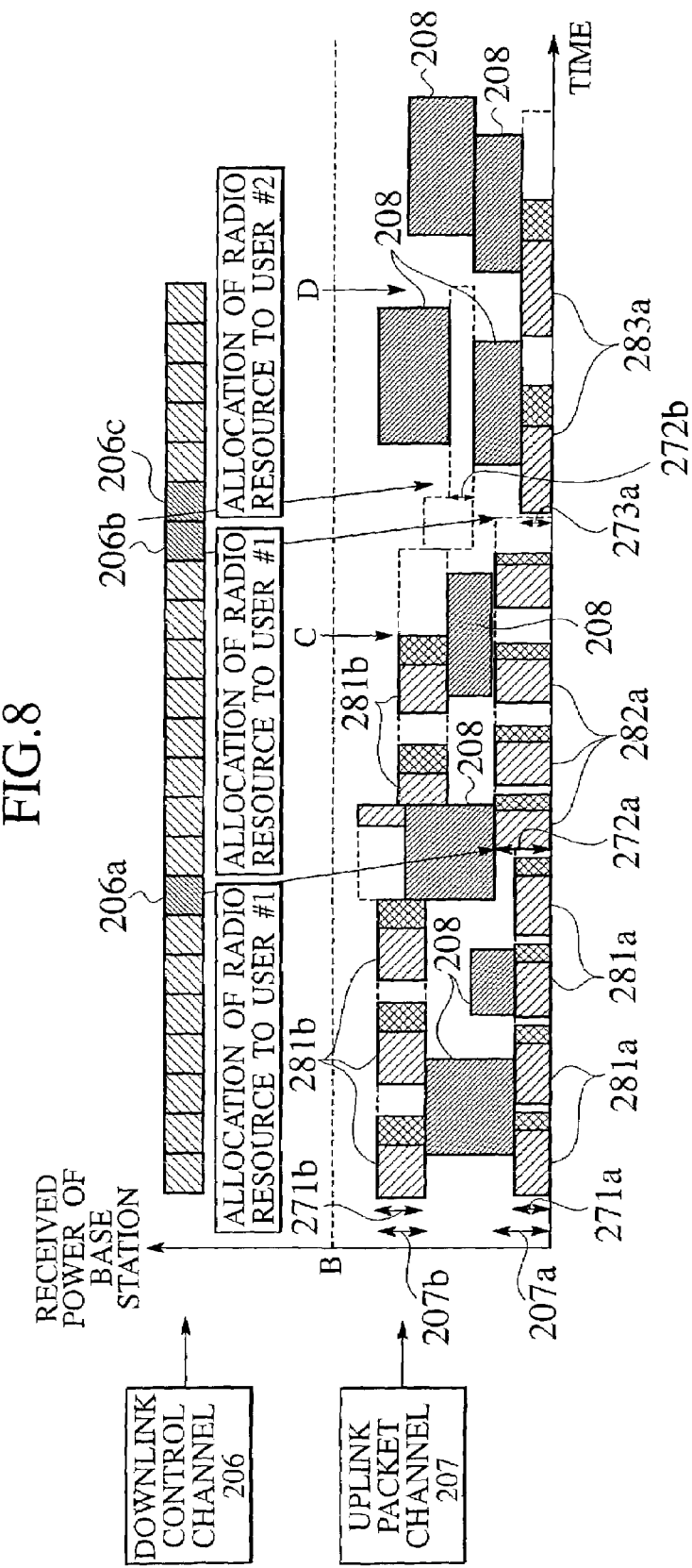
FIG. 8 is a view explaining an allocation and a reallocation of radio resources in CDMA according to the embodiment of the present invention.

The axis of ordinates of FIG. 8 represents the received power in the base station 2, and the axis of abscissas thereof represents time. The value of the reference symbol B indicates the uplink channel capacity. In the CDMA, the base station 2 is specified with the maximum quantity of the electric power as the maximum quantity of radio resources from the users #1 and #2. The radio resource controller 25b allocates the specified maximum quantity of the electric power as priority radio resources to the mobile stations 3 of the users #1 and #2. The radio resource controller 25b allocates the received power 207a as the priority radio resource to the mobile station 3 of the user #1. Moreover, the radio resource controller 25b allocates the received power 207b as the priority radio resource to the mobile station 3 of the user #2.

Next, similarly to the case of the TDMA, the radio resource controller 25b allocates usable radio resources from the priority radio resources allocated to the mobile stations 3 of the users #1 and #2 by using the quantity of the stored packets. The real time packets 281a to 283a, 281b and the non-real time packet 208 include user data and control signals. The quantity of stored packets is included in the control signals. Therefore, the base station 2 acquires the quantity of stored packets by receiving the packets from the mobile stations 3.

The radio resource controller 25b first allocates the received power 271a, then the received power 272a, and then the received power 273a as usable radio resources to the mobile station 3 of the user #1 within a range that does not exceed the received power 207a. The radio resource controller 25b first allocates the received power 271b, and then the received power 272b as usable radio resources to the mobile station 3 of the user #2 within a range that does not exceed the received power 207b. Then, the received power 271a to 273a of the usable radio resources allocated to the user #1 are used for transmitting the real time packets 281a to 283a. The received power 271b of the usable radio resources allocated to the user #2 is used for transmitting the real time packet 281b of the user #2.

Moreover, the radio resource controller 25b does not allocate the remaining received power which is obtained by subtracting the sum of the received power 207a and 207b allocated to the users #1 and #2, respectively, from the uplink channel capacity B, to either of the users #1 and #2.

Then, the radio resource controller 25b sets the remaining received power as the open radio resources used for transmitting the non-real time packets 208. Moreover, the radio resource controller 25b also sets received power that has not been allocated as the usable radio resources from the received power 207a and 207b of the priority radio resources allocated to the users #1 and #2 as open radio resources.

Then, the control signal processor 25a generates the control signals 206a to 206c, which includes radio resource information. The control signals 206a and 206b include the received power 272a and 273a of the usable radio resources allocated to the user #1, that is, transmission power usable by the user #1. The control signal 206c includes the received power 272b of the usable radio resources, which is allocated to the user #2, that is, transmission power usable by the user #2. The TRX 22 reports the control signals 206a and 206b to the mobile station 3 through the antenna 21, by the downlink control channel 206.

Moreover, the mobile station 3 of the user #2 does not transmit any real time packet by use of the received power 271b and 272b allocated as the usable radio resources from the point of time shown by arrow C in FIG. 8. Therefore, the base station 2 does not receive the real time packets of the user #2, which use the received power 271b and 272b, for a certain period. Accordingly, the radio resource controller 25b determines that the usable radio resources allocated to the user #2 have been unused for a certain period. Then, the radio resource controller 25b reallocates the received power 272b, which was allocated as priority radio resources to the user #2. Therefore, the allocation of the received power 272b is reallocated at the point of time shown by the arrow D in FIG. 8. Consequently, the transmission power 272b which was allocated to the user #2 becomes open radio resource at the point of time of the arrow D in FIG. 8 and after, and will be used for transmitting the non-real time packet 208.

Figure 9:
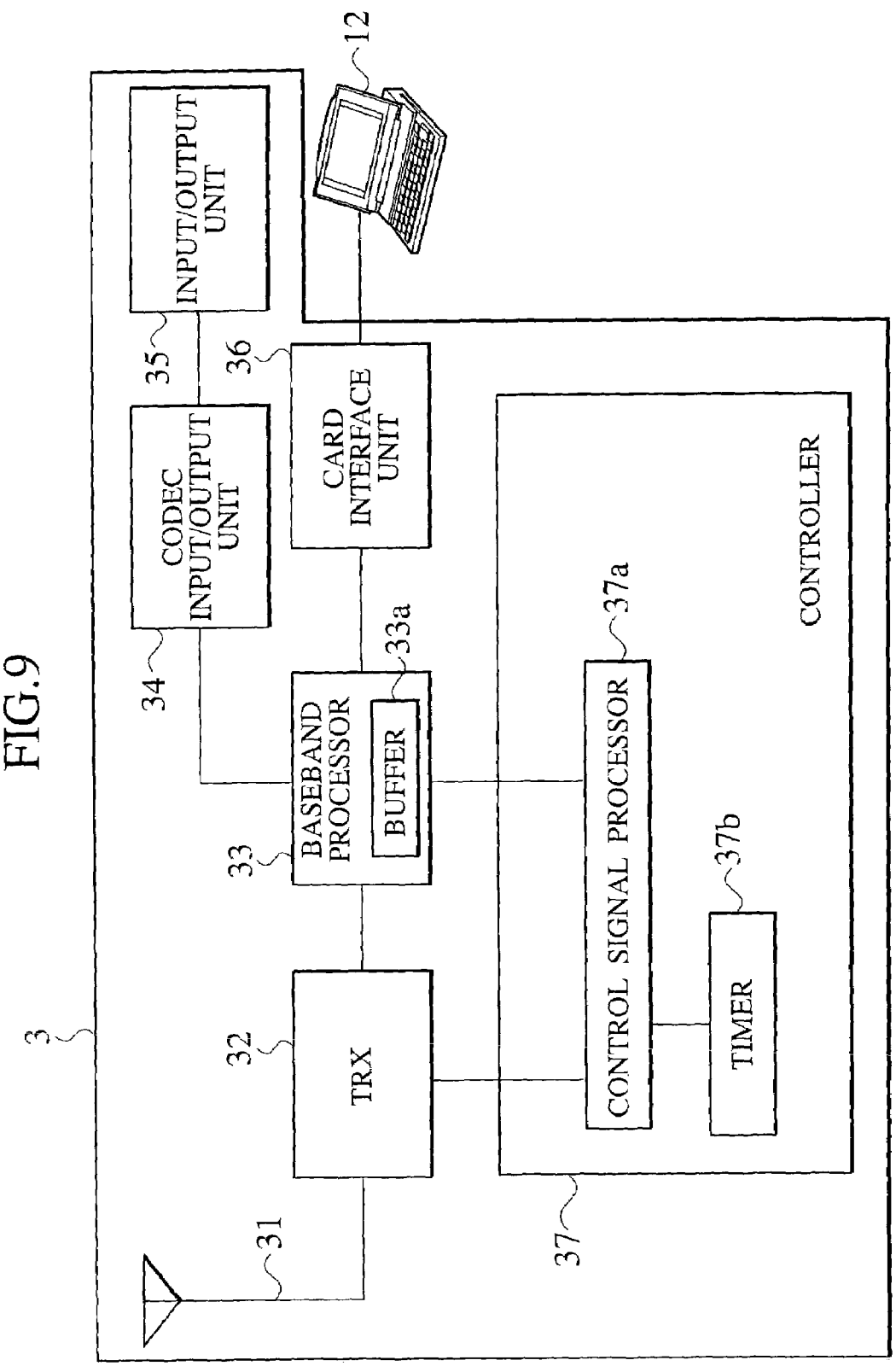
FIG. 9 is a block diagram illustrating a configuration of a mobile station according to the embodiment of the present invention.

Among the mobile stations 3, there are mobile stations that perform the real time communication such as communications of a voice, a moving picture and a streaming image, mobile stations that perform the non-real time communication such as a data communication, and a multifunctional mobile station performing both the real time and non-real time communications. As shown in FIG. 9, the mobile station 3 includes the antenna 31, the TRX 32, the baseband processor 33, the codec input/output processor 34, the input/output unit 35, the card interface unit 36, and the controller 37. The baseband processor 33 includes the buffer 33a. The controller 37 includes the control signal processor 37a and the timer 37b.

The input/output unit 35 receives information to be transmitted by the mobile station 3 and outputs the received information. The input/output unit 35 could include, for example, a speaker, a microphone, a keyboard and the like. The codec input/output processor 34 carries out processing of information to be outputted to the input/output unit 35 and processing of information inputted from the input/output unit 35. For example, the codec input/output processor 34 encodes voice information inputted from the input/output unit 35 and decodes information to be outputted to the input/output unit 35. The codec input/output processor 34 inputs the information inputted from the input/output unit 35 to the baseband processor 33.

The card interface unit 36 acquires information to be transmitted by the mobile stations 3, through a card dedicated to data transmission such as a PC card from an external device such as the personal computer 12. Moreover, the card interface unit 36 inputs the information received by the mobile station 3 through the card to the external device such as the personal computer 12. The card interface unit 36 inputs the information acquired from the personal computer 12 to the baseband processor 33.

The baseband processor 33 generates the user data 811 of the packet based on the information inputted from the codec input/output processor 34 and the card interface unit 36. Moreover, the baseband processor 33 receives the control signal 812 including the quantity of the storage packet generated by the control signal processor 37*a* from the control signal processor 37*a*. Then, the baseband processor 33 generates the packet 81*b* including the signal 812 and the user data 811, which is as shown in FIG. 6. The buffer 33*a* maintains the packet. The baseband processor 33 stores the generated packet in the buffer 33*a*. In such a manner, the packets to be transmitted by the mobile stations 3 are stored in the buffer 33*a*. Moreover, when generating the real time packets, the baseband processor 33 reports the generation of the real time packets to the control signal processor 37*a*. Moreover, the baseband processor 33 reports the quantity of the stored packets to the control signal processor 37*a*.

The baseband processor 33 takes out the packets from the buffer 33*a*. Moreover, the baseband processor 33 receives a control signal generated by the control signal processor 37*a*, which requires real time communication. The baseband processor 33 performs signal processing such as spreading of the packets and the control signal, and inputs the processed packets and control signal to the TRX 32. Moreover, the baseband processor 33 performs signal processing such as despreading of the signal inputted from the TRX 32. The baseband processor 33 inputs the control signals 6*a* to 6*d* and 206*a* to 206*c* inputted from the TRX 32, which are transmitted from the base station 2 by the downlink control channel 6, to the control signal processor 37*a*. Moreover, the baseband processor 33 inputs the information inputted from the TRX 32 to the codec input/output processor 34 and the card interface unit 36.

The TRX 32 is a wireless unit. The TRX 32 transmits the packets inputted from the baseband processor 33 to the base station 2 through the antenna 31. In this case, the TRX 32 carries out the transmission of the packets in accordance with the control of control signal processor 37*a*. Moreover, the TRX 32 transmits the control signal requiring the real time communication inputted from the baseband processor 33, to the base station 2 through the antenna 31. Moreover, the TRX 32 inputs the received information and control signals 6*a* to 6*d* and 206*a* to 206*c* to the baseband processor 33.

Upon receiving the notice of the generation of the real time packets from the baseband processor 33, the control signal processor 37*a* generates a control signal reporting the generation of the real time packets to the base station 2. Concretely, the control signal processor 37 reports the generation of the real time packets to the base station 2 by requiring real time communication of the base station 2. Therefore, the control signal processor 37*a* generates the control signal requiring real time communication. The control signal processor 37*a* specifies the maximum quantity of the radio resource to the base station 2 while adding the maximum quantity of the radio resources necessary for the real time communication to the control signal requiring the real time communication. The control signal processor 37*a* generates a control signal including the maximum quantity of the radio resources necessary to transmit the generated real time packets. To the base station 2, the control signal processor 37*a* specifies the maximum number of the time slots necessary to transmit the real time packets in the case of the TDMA, and the maximum quantity of the electric power in the case of the CDMA. Note that the control signal processor 37*a* specifies a default value predetermined as the maximum quantity of the radio resources when the control signal processor 37*a* cannot determine the maximum quantity of the radio resources necessary for real time communication.

As described above, when the real time packets are generated in the mobile station 3, it is preferable that the mobile station 3 report the generation thereof. In accordance with this, the mobile station 3 can be allocated preferentially with the priority radio resources by the base station 2 in response to the generation of the real time packets. Therefore, the radio resources can be used more efficiently in the connectionless-type communication.

Furthermore, the mobile station 3 should specify the maximum quantity of the radio resources necessary to transmit the generated real time packets to the base station 2. In accordance with this, the mobile station 3 can be allocated preferentially with the priority radio resources sufficient to reserve the maximum quantity of the radio resources by the base station 2. Accordingly, the mobile station 3 can satisfy the acceptable delay time of the real time packets.

Moreover, upon receiving the notice of the quantity of stored packets of the buffer 33*a* from the baseband processor 33, the control signal processor 37*a* generates the control signal 812 including the quantity of the stored packets. The control signal processor 37*a* inputs the generated control signal to the baseband processor 33.

Moreover, the control signal processor 37*a* receives the control signals 6*a* to 6*d* and 206*a* to 206*c*, which are transmitted from the base station 2 by the downlink control channel 6 from the baseband processor 33. The control signal processor 37*a* takes out the radio resource information such as the allocation result of the radio resources and the information about open radio resources from the control signals. Then, the control signal processor 37*a* controls the transmission of the packets, which is performed by the TRX 32, in accordance with the radio resource information thereof. For example, the control signal processor 37*a* controls the TRX 32 to transmit the real time packets by use of the allocated time slots for use in the case of the TDMA and using the allocated transmission power in the case of the CDMA. Moreover, the control signal processor 37*a* controls the TRX 32 to transmit the non-real time packets by use of the open radio resources.

In such a manner, the mobile station 3 transmits the real time packets by using the allocated usable radio resources, and transmits the non-real time packets by using the open radio resources. Note that the non-real time packets can be transmitted by using an arbitrary access protocol including a random access system such as Slotted ALOHA and CSMA and a reservation-type access system.

Moreover, the control signal processor 37*a* works together with the timer 37*b*. The control signal processor 37*a* acquires a time from the timer 37*b* in such a case where the termination of the communication is determined based on the time. The antenna 31 transmits/receives signals from/to the base station 2. The antenna 31 inputs the signals received from the base station 2 to the TRX 32. Moreover, the antenna 31 transmits the signals inputted from the TRX 32 to the base station 2.

As described above, the control signal processor 37*a*, the baseband processor 33, the TRX 32 and the antenna 31 carry out the control of the packet transmission in response to the radio resource information, the processing of the signals and the transmission of the signals, thus functioning as a transmitter transmitting the packets by use of the radio resources allocated by the base station 2.

Moreover, the control signal processor 37a, the baseband processor 33, the TRX 32 and the antenna 31 carry out the generation of the control signals requiring the real time communication, the processing and transmission of the signals, thus functioning as a packet generation notification unit reporting the generation of packets to the base station 2.

Moreover, the control signal processor 37a, the baseband processor 33, the TRX 32 and the antenna 31 carry out the generation of the control signals including the quantity of the stored packets, the processing of the signals and the transmission of the signals, thus functioning as a packet quantity notification unit reporting the quantity of stored packets to the base station 2.

In addition to the above, the baseband processor 33 generates the packets 81b that includes the control signal 812 including the quantity of the stored packets and the user data 811. Then, the TRX 32 transmits the packet 81b through the antenna 31 to the base station 2. Therefore, the mobile station 3 can report the transmission of the stored packets in the event of transmitting the packet. Accordingly, the mobile station 3 can report the quantity of the stored packets in combination with the transmission of the packets, and can eliminate the necessity of reporting the quantity of stored packets separately.

Note that the antenna 31 may receive control signals including periodic timing for reporting the quantity of stored packets allocated by the base station 2, and may input the same control signals to the baseband processor 33 through the TRX 32. In this case, the baseband processor 33 inputs the control signals inputted from the TRX 32 to the control signal processor 37a. The control signal processor 37a takes out the periodic timing for reporting the quantity of the stored packets from the control signals. Then, the control signal processor 37a acquires a time from the timer 37b, and acquires the quantity of the stored packets from the baseband processor 33 in accordance with the periodic timing. The control signal processor 37a generates the control signals including the acquired quantity of the stored packets and inputs the same signals to the baseband processor 33. Then, the TRX 32 transmits the control signals including the quantity of stored packets to the base station 2 through the antenna 31. In accordance with this, the base station 2 can allocate the usable radio resources periodically by use of the quantity of the stored packets reported periodically thereto. Accordingly, the mobile station 3 can receive the allocation of the radio resources, which is reviewed periodically, and can prevent unnecessary radio resources being allocated.

Moreover, the mobile station 3 may be adapted to report the quantity of the stored packets only when the quantity of the stored packets is large and the allocated usable radio resources are not sufficient to transmit the real time packets. Moreover, the mobile stations 3 may be adapted to report the quantity of the stored packets only when untransmitted packets exist in the buffer 33. Specifically, the mobile stations 3 may be adapted not to report the quantity of stored packets when the quantity thereof is zero.

Next, a communication method carried out by use of the communication system 1 will be described. First, the operation of the base station 2 will be described with reference to FIGS. 10A and 10B. As shown in FIG. 10A, the base station 2 always monitors the existence of the requests for the real time communications from the mobile stations 3 by the uplink control channel (S101). Then, upon receiving a request for the real time communications, the base station 2 activates the processing 1 (S102). The base station 2 continues to monitor the existence of the requests when there are no more requests for the real time communications in Step S101.

FIG. 10B shows the procedure of the processing 1. The radio resource controller 25b determines whether or not the priority radio resources enough to reserve the maximum quantity of the radio resources specified in the request for the real time communication in Step S101 can be allocated to the mobile station 3 (S201). If such allocation is possible, then the radio resource controller 25b receives the requests for the real time communication and allocates the quantity of the priority radio resources sufficient to reserve the maximum quantity of the radio resources to the mobile station 3 (S202). Note that the radio resource controller 25b allocates the entire priority radio resources as the first usable radio resources when allocating the priority radio resources, and starts the communication. On the other hand, if the radio resource controller 25b determines that the radio resources to be allocated do not exist and that the allocation is impossible in Step S201, then the base station 2 rejects the receipt of the request for the real time communication (S208). Then, the base station 2 terminates the processing 1.

The mobile station 3 starts to transmit the real time packets by use of the usable radio resources, which are allocated in Step S202. The base station 2 receives the packets that include the user data and the control signals that include the quantity of the stored packets which are transmitted from the mobile station 3 (S203). Then, in the case where the mobile station 3 terminates the communication definitively (S204), the base station 2 reallocates the allocated priority radio resources (S209). Then, the base station 2 terminates the processing 1. Note that such definitive termination of the communication indicates, for example, the case where the mobile station 3 transmits a signal reporting the termination of the communication.

On the other hand, if the communication is not terminated in Step S204, then the base station 2 determines that the communication is to be continued. Next, the base station 2 determines whether or not the base station 2 has received the real time packets using the usable radio resources for a certain period (S205). When the base station 2 determines that it has not received the real time packets for the certain period in Step S205, the base station 2 reallocates the allocated priority radio resources (S209). Then, the base station 2 terminates the processing 1. On the other hand, if the base station 2 has received the real time packets without pausing for a certain period in Step S205, then the radio resource controller 25b calculates a quantity of usable radio resources to be allocated to the next frame based on the quantity of stored packets and the variations thereof. Then, the radio resource controller 25b allocates the usable radio resources to the user of the mobile station 3 based on the calculations result (S206).

Next, the base station 2 reports, to the mobile station 3, the radio resource information such as the usable radio resources allocated to the user of the mobile station 3 and the open radio resources, by the control signals 6a to 6c of the downlink control channel 6 (S207). Note that the radio resource information includes that the usable radio resources are the time slots for transmitting the real time packets and that the open radio resources are the time slots for transmitting the non-real time packets.

Thereafter, until the processing 1 is terminated, the base station 2 repeats: the receipt of the packets (S203), the calculation of the quantity of the usable radio resources (S206) and the notification of the radio resource information (S207). The processing 1 is terminated with the definitive termination of the communication in Step S204 and by not having received the real time packets, which use the usable radio resources for the certain period in Step S205.

Next, the operation of the mobile station 3 will be described with reference to FIG. 11. As shown in FIG. 11, the baseband processor 33 generates packets in the mobile station 3. When the packets are generated in such a manner (S301), the baseband processor 33 reports the generation of real time packets to the control signal processor 37a if the packets are real time packets (S302). Upon receiving such a notice, the control signal processor 37a generates a control signal requiring a real time communication, which is specified with the maximum quantity of radio resources necessary for real time communication. Then, the mobile station 3 transmits this type of request for real time communication to the base station 2 by transmitting the concerned control signal (S303).

On the other hand, when no packets are generated in the mobile station 3 in Step S301, the mobile station 3 is on standby by the loop processing until the packets are generated. Moreover, when the generated packets are non-real time packets in Step S302, the baseband processor 33 inputs the non-real time packets to the TRX 32. The control signal processor 37a confirms the time slots for transmitting the non-real time packets of the open radio resources from the base station 2 (S308).

Then, the control signal processor 37a controls the TRX 32 to transmit the non-real time packets by use of the time slots for transmitting the confirmed non-real time packets. In accordance with the control of the control signal processor 37a, the TRX 32 transmits the non-real time packets by random access and the like (S309). After the transmission thereof, the mobile station 3 returns to Step S301, and confirms whether or not packets are generated for the mobile station 3.

In the case where the mobile station 3 is allocated with the priority radio resources and the usable radio resources from the base station 2 (S304), upon receiving the request for the real time communication in Step S303, the mobile station 3 starts to transmit the real time packets by use of the concerned usable radio resources. In this case, the mobile station 3 transmits the real time packets composed of the control signal which include the user data and the quantity of the stored packets, and thus reports the quantity of stored packets to the base station 2 (S305). On the other hand, when the request for the real time communication received from the mobile station 3 is rejected by the base station 2 in Step S304 and the mobile station 3 is not allocated with the priority radio resources, a call loss is caused (S310). Thereafter, the mobile station 3 returns to Step S301, and confirms whether or not packets have been generated for the mobile station 3.

When the mobile station 3 terminates the communication definitively (S306) after transmitting the real time packets in Step S305, the mobile station 3 returns to Step S301, and confirms whether or not packets have been generated for the mobile station 3. On the other hand, when the mobile station 3 does not terminate the communication in Step S306, the mobile station 3 continues the communication. Then, the mobile station 3 receives the notice of the allocation result of the usable radio resources (time slots for transmitting the real time packets) in the next frame based on the quantity of the stored packets reported in Step S305, with the allocation being carried out by the base station 2 (S307). Then, the mobile station 3 repeats the transmission of the real time packets and the receipt of the notice of the allocation result (S307) to the base station 2 (S305) until the mobile station 3 terminates the communication in Step S306 and no longer receives the allocation result in Step S307.

On the other hand, when the mobile station 3 is unable to receive the notice of the allocation result from the base station 2 in Step S307, the mobile station 3 returns to Step S303 and again transmits the request for the real time communication to the base station 2. This is in the case where the priority radio resources allocated to the mobile station 3 by the base station 2 are opened since the mobile station has not transmitted the real time packets for the certain period, and the like.

As described above, according to the communication system 1, the base station 2, the radio resource control equipment 25 and the communication method, the radio resource controller 25b allocates the time slots 7a and 7b and the received power 207a and 207b, which are the priority radio resources preferentially usable by the users #1 and #2 of the mobile stations 3, to the uplink packet channels 7 and 207 for the mobile stations 3. Therefore, the users #1 and #2 of the mobile stations 3 can reserve the time slots 7a and 7b and the received power 207a and 207b, which are preferentially usable by the users #1 and #2 of the mobile stations 3.

Moreover, the antenna 21, the TRX 22, the baseband processor 23 and the control signal processor 25a acquire from the mobile stations 3 the quantity of the stored packets stored in the buffer 33a. Then, the radio resource controller 25b allocates the time slots 71a to 73a and 71b to 73b and the received power 271a to 273a, 271b and 272b (which are the usable radio resources allowed to be used by the users #1 and #2 of the mobile stations 3), among the time slots 7a and 7b and the received power 207a and 207b by use of the acquired quantity of the stored packets. Then, the antenna 21, the TRX 22, the baseband processor 23 and the control signal processor 25a report the allocation results thereof to the mobile stations 3. Therefore, the base station 2 can dynamically change the allocation of the time slots 71a to 73a and 71b to 73b and the received power 271a to 273a, 271b and 272b (which are the radio resources to be used by the mobile stations 3), by use of the quantity of the stored packets stored in the buffer 33a. Furthermore, as in scheduling, the base station 2 and the mobile stations 3 do not always need to transmit/receive thereamong and be aware of information such as the priorities, the elapsed time and the like regarding the entire packets.

Accordingly, the control delay is prevented, and the mobile station 3 can reserve the priority radio resources usable preferentially, and therefore, the base station 2 can satisfy the acceptable delay time required for the packets. In this connection, the base station 2 can perform delay guarantee when the mobile stations 3 transmit the real time packets, each having a short acceptable delay time. Furthermore, the base station 2 increases/decreases the allocation of the usable radio resources by use of the quantity of the stored packets, and thus can dynamically change the allocation in response to the state of the buffer 33a. Therefore, the base station 2 prevents the allocation of unnecessary radio resources to the mobile stations 3, thus making it possible to use the radio resources efficiently.

Particularly, even if the mobile stations 3 transmit packets of which transfer rate is not definitive or varied, the base station 2 satisfies the acceptable delay time by allocating the priority radio resources to some extent and dynamically changes the allocation of usable radio resources upon receiving the request for the real time communication, in which a default value is specified. Thus, the base station 2 can realize the efficient use of the radio resources.

Moreover, in each mobile station 3, the antenna 31, the TRX 32, the baseband processor 33 and the control signal processor 37a report the quantity of stored packets stored in the buffer 33a to the base station 2. Therefore, the base station 2 can dynamically change the allocation of the usable radio resources by means of the quantity of the stored packets, which is reported from the mobile station 3. Accordingly, the antenna 31, the TRX 32, the baseband processor 33 and the control signal processor 37a can transmit the packets by use of the usable radio resources allocated dynamically by the base station 2. Hence, the allocation of unnecessary radio resources can be prevented, thus radio resources are able to be effectively utilized.

In this connection, the communication system 1, the base station 2, the radio resource control equipment 25, the mobile station 3 and the communication method can satisfy the acceptable delay time required for the packets and enable the efficient use of the radio resources. Note that the present invention is not limited to the above-described embodiment, and that various modifications are possible.

What is claimed is:

1. A base station for allocating radio resources to a first mobile station, which transmits real time packets and non-real time packets, and a second mobile station, which transmits the non-real time packets, the base station, comprising:
   an acquisition unit configured to acquire, from the first mobile station, a value indicating a quantity of stored real time packets to be transmitted by the first mobile station, the real time packets being stored in a buffer for storing the real time packets at the first mobile station;
   a radio resource controller configured to allocate priority radio resources, which indicate a maximum quantity of radio resources necessary to transmit the real time packets, to the first mobile station on a radio channel, and to allocate, to the first mobile station, usable radio resources to be used by the first mobile station for transmitting the real time packets, within the allocated priority radio resources, based on the value acquired by the acquisition unit; and
   a result notification unit configured to report the usable radio resources allocated by the radio resource controller to the first mobile station, wherein
   a quantity of the radio resources necessary to transmit the real time packets are varied,
   a priority of the non-real time packets are lower than a priority of the real time packets, and
   the radio resources, which are not allocated as the usable radio resources within the priority radio resources, are used for transmitting the non-real time packets by the first mobile station or the second mobile station.

2. The base station of claim 1, wherein the radio resource controller is configured to allocate the usable radio resources in accordance with the value acquired by the acquisition unit.

3. The base station of claim 1, wherein the radio resource controller is configured to obtain variations of the quantity of stored real time packets by use of the value acquired by the acquisition unit, and to allocate the usable radio resources in accordance with the variations.

4. The base station of claim 1, wherein the radio resource controller is configured to obtain variations of the quantity of stored real time packets by use of the value acquired by the acquisition unit, and to allocate the usable radio resources in accordance with the variations and the quantity of stored real time packets.

5. The base station of claim 1, wherein the acquisition unit is configured to acquire the value when the first mobile station transmits the real time packets to the base station.

6. The base station of claim 1, wherein the acquisition unit is configured to obtain the value from the first mobile station periodically.

7. The base station of claim 1, wherein the radio resource controller is configured to allocate the priority radio resources when the real time packets to be transmitted by the first mobile station are generated therein.

8. The base station according to claim 1, wherein the radio resource controller is configured to reallocate the priority radio resources when the usable radio resources are not used for a certain period.

9. The base station of claim 1, wherein the radio resource controller is configured to set unused radio resources as open usable radio resources on the radio channel,
   the unused radio resources include radio resources not having been allocated as the priority radio resources and not having been allocated as the usable radio resources within the priority radio resources,
   the open usable radio resources being used for transmitting packets having a low priority in transmission by the first mobile station and the second mobile station, and
   the priority radio resources being used for transmitting the packets by the first mobile station more preferentially than transmitting the packets by the second mobile station.

10. A radio resource control equipment for allocating radio resources to a first mobile station, which transmits real time packets and non-real time packets, and a second mobile station, which transmits the non-real time packets, the radio resource control equipment comprising:
    a radio resource controller configured to allocate priority radio resources, which indicate a maximum quantity of radio resources necessary to transmit the real time packets, to the first mobile station on a radio channel, and to allocate, to the first mobile station, usable radio resources to be used by the first mobile station for transmitting the real time packets stored in the first mobile station, within the allocated priority radio resources, based on a value, acquired by an acquisition unit, indicating a quantity of stored real time packets to be transmitted by the first mobile station, the real time packets being stored in a buffer for storing the real time packets at the first mobile station,
    wherein a quantity of the radio resources necessary to transmit the real time packets are varied,
    a priority of non-real time packets are lower than a priority of the real time packets; and
    the radio resources, which are not allocated as the usable radio resources within the priority radio resources, are used for transmitting the non-real time packets by the first mobile station or the second mobile station.

11. A mobile station, comprising:
    a transmitter configured to transmit real time packets and non-real time packets;
    a buffer configured to store the real time packets transmitted by the transmitter; and
    a packet quantity notification unit configured to report, to an acquisition unit of a base station, a value indicating a quantity of stored real time packets stored in the buffer, wherein a quantity of radio resources necessary to transmit the real time packets is varied, a priority of a non-real time packets is lower than a priority of the real time packets, the transmitter being configured to transmit the real time packets by use of usable radio resources for transmitting the real time packets allocated within priority radio resources, the usable radio resources and the priority radio resources being allocated by a radio resource controller of the base station, based on the value indicating the quantity of the stored real time packets, the priority radio resources indicating a maximum quantity of radio resources necessary to transmit the real time packets and being allocated on a radio channel by the base station, and the transmitter being configured to transmit the non-real time packets by use of the radio resources, which are not allocated as the usable radio resources within the priority radio resources.

12. The mobile station of claim 11, wherein the packet quantity notification unit is configured to report the value to the base station when the mobile station transmits the real time packets to the base station.

13. The mobile station of claim 11, wherein the packet quantity notification unit is configured to report the value to the base station periodically.

14. The mobile station of claim 11, further comprising:
a packet generation notification unit configured to report generation of the real time packets to be transmitted by the transmitter when the real time packets are generated.

15. The mobile station of claim 14, wherein the packet generation notification unit is configured to specify the maximum quantity of radio resources necessary to transmit the generated real time packets to the base station.

16. A communication system, comprising:
a first mobile station configured to transmit real time packets and non-real time packets;
a second mobile station configured to transmit the non-real time packets; and
a base station,
wherein the first mobile station includes:
a transmitter configured to transmit the real time packets by use of usable radio resources allocated within priority radio resources, the priority radio resources being allocated to the first mobile station by the base station;
a buffer configured to store the real time packets to be transmitted by the transmitter; and
a packet quantity notification unit configured to report, to the base station, a value indicating a quantity of stored real time packets stored in the buffer, and
wherein the base station includes:
an acquisition unit configured to acquire, from the first mobile station, the value indicating the quantity of stored real time packets from the first mobile station;
a radio resource controller configured to allocate the priority radio resources, which indicate a maximum quantity of radio resources necessary to transmit the real time packets, to the first mobile station on a radio channel, and to allocate, to the first mobile station, the usable radio resources to be used by the first mobile station for transmitting the real time packets, within the allocated priority radio resources, based on the value acquired by the acquisition unit; and a result notification unit configured to report usable radio resources allocated by the radio resource controller to the first mobile station, wherein the quantity of radio resources necessary to transmit the real time packets is varied, a priority of the non-real time packets are lower than a priority of the real time packets, and the radio resources, which are not allocated as the usable radio resources within the priority radio resources, are used for transmitting the non-real time packets by the first mobile station or the second mobile station.

17. A communication method, comprising:

allocating priority radio resources, by a radio resource controller of a base station which indicate a maximum quantity of radio resources necessary to transmit real time packets, to a first mobile station on a radio channel;

acquiring, by an acquisition unit of the base station from the first mobile station, a value indicating a quantity of real time packets stored in a buffer to be transmitted by the first mobile station; and allocating, by the radio resource controller, to the first mobile station, usable radio resources to be used by the first mobile station for transmitting the real time packets, within the allocated priority radio resources, based on the value indicating the quantity of stored real time packets acquired by the base station, wherein a quantity of the radio resources necessary to transmit the real time packet is varied, a priority of non-real time packets are lower than a priority of the real time packets, and the radio resources, which are not allocated as the usable radio resources within the priority radio resources, are used for transmitting the non-real time packets by the first mobile station or a second mobile station.

18. The communication method of claim 17, wherein in the step of allocating the priority radio resources, the priority radio resources are allocated when the real time packets to be transmitted by the first mobile station are generated therein.

19. The communication method of claim 17, further comprising:
reallocating the priority radio resources when the usable radio resources are not used for a certain period.

20. The communication method of claim 17, further comprising:
setting unused radio resources as open usable radio resources on the radio channel,
the unused radio resources include radio resources not having been allocated as the priority radio resources and not having been allocated as the usable radio resources within the priority radio resources,
the open usable radio resources being used for transmitting the non-real time packets by the first mobile station and the second mobile station, and
the priority radio resources being used for transmitting the packets by the first mobile station more preferentially than transmitting the packets by the second mobile station.

* * * * *